(12) United States Patent
Kunisa

(10) Patent No.: US 7,487,356 B2
(45) Date of Patent: Feb. 3, 2009

(54) DIGITAL WATERMARKING SYSTEM USING SCRAMBLING METHOD

(75) Inventor: Akiomi Kunisa, Tokyo (JP)

(73) Assignee: Sanyo Electric Co., Ltd., Osaka (JP)

( * ) Notice: Subject to any disclaimer, the term of this patent is extended or adjusted under 35 U.S.C. 154(b) by 569 days.

(21) Appl. No.: 10/358,227

(22) Filed: Feb. 5, 2003

(65) Prior Publication Data
US 2003/0152225 A1    Aug. 14, 2003

(30) Foreign Application Priority Data
Feb. 13, 2002    (JP)    ............................ 2002-036074

(51) Int. Cl.
H04L 9/00 (2006.01)
G06K 9/00 (2006.01)
H04K 1/02 (2006.01)
H04N 7/167 (2006.01)
H03D 3/24 (2006.01)

(52) U.S. Cl. ................ 713/176; 382/100; 380/252; 380/205; 373/130

(58) Field of Classification Search ............... 713/176; 380/205, 252; 382/100
See application file for complete search history.

(56) References Cited

U.S. PATENT DOCUMENTS

| | | | | |
|---|---|---|---|---|
| 6,061,793 | A * | 5/2000 | Tewfik et al. ............... | 713/176 |
| 6,285,774 | B1 * | 9/2001 | Schumann et al. .......... | 382/100 |
| 6,332,030 | B1 * | 12/2001 | Manjunath et al. .......... | 382/100 |
| 6,345,100 | B1 * | 2/2002 | Levine ....................... | 380/205 |
| 6,359,998 | B1 * | 3/2002 | Cooklev ..................... | 382/100 |
| 6,535,617 | B1 * | 3/2003 | Hannigan et al. ........... | 382/100 |
| 6,557,103 | B1 * | 4/2003 | Boncelet et al. ............ | 713/176 |
| 6,665,419 | B1 * | 12/2003 | Oami ......................... | 382/100 |
| 6,674,861 | B1 * | 1/2004 | Xu et al. ..................... | 380/252 |
| 6,768,807 | B1 * | 7/2004 | Muratani .................... | 382/100 |
| 6,853,676 | B2 * | 2/2005 | Kim ........................... | 375/130 |
| 6,934,403 | B2 * | 8/2005 | Joo et al. .................... | 382/100 |

(Continued)

FOREIGN PATENT DOCUMENTS

JP    11-164132    6/1999

(Continued)

OTHER PUBLICATIONS

Japanese Office Action, with English translation, issued in Japanese Patent Application No. JP 2005-19447, mailed Dec. 4, 2007.

(Continued)

*Primary Examiner*—Emmanuel L Moise
*Assistant Examiner*—Techane J Gergiso
(74) *Attorney, Agent, or Firm*—McDermott Will & Emery LLP

(57) ABSTRACT

An encoding apparatus that embeds a watermark in host data is provided. A multiplexer generates a plurality of bit sequences by adding initial data to the head of the watermark. A scrambler scrambles a plurality of the bit sequences respectively and generates a plurality of scrambled watermarks. An embedder embeds a plurality of the scrambled watermarks in the host data and generates a plurality of candidate watermarked host data. A signal-to-noise ratio calculator evaluates the robustness of the watermarks hidden in the respective candidate watermarked host data. A selector selects one candidate that has the highest level of the robustness as a final watermarked host data.

33 Claims, 15 Drawing Sheets

U.S. PATENT DOCUMENTS

| | | | |
|---|---|---|---|
| 6,983,051 B1 * | 1/2006 | Rhoads | 380/252 |
| 6,996,248 B2 * | 2/2006 | Fudge et al. | 382/100 |
| 2001/0044899 A1 * | 11/2001 | Levy | 713/176 |
| 2003/0070075 A1 * | 4/2003 | Deguillaume et al. | 713/176 |
| 2003/0161496 A1 * | 8/2003 | Hayashi et al. | 382/100 |

FOREIGN PATENT DOCUMENTS

| | | |
|---|---|---|
| JP | 2000-13587 A | 1/2000 |
| JP | 2000-165643 A | 6/2000 |
| JP | 2000-295454 | 10/2000 |
| JP | 2001-125484 A | 5/2001 |

OTHER PUBLICATIONS

Foreign Office Action for Corresponding Japanese Patent Application No. 2002-036074 (w/English Translation) Reference No. NER1016033 Dispatch No. 331459 Dispatch Date: Sep. 6, 2005 Patent Application No. 2002-036074 Drafting Date: Sep. 1, 2005 Applicant: Sanyo Electric Co., Ltd. Respresentative/Applicant: Sakaki Morishita.

* cited by examiner

DIGITAL WATERMARKING SYSTEM USING SCRAMBLING METHOD

BACKGROUND OF THE INVENTION

1. Field of the Invention

The present invention relates to a digital watermarking technology, and it particularly relates to a method for embedding a digital watermark and an encoding apparatus and a decoding apparatus using the same method.

2. Description of the Related Art

The number of Internet users has rapidly increased in recent years and we are now entering the age of the broadband, or a new stage in the utilization of the Internet.

Since communication bandwidth has greatly expanded in broadband communication, the distribution of items containing large bodies of data such as audio, still image, and video can be enjoyed with ease. When the distribution of such digital items becomes popular, a highly efficient method of protecting the copyright of their contents will be required.

In the present situation, the copyright is not protected well so that users can easily copy such contents distributed via the Internet. Therefore, technology for embedding information on the originator of the content and the user into the content as a digital watermark has been developed. By using this watermarking technology, it becomes possible to extract the digital watermark from the content distributed via the network, and thereby detect an illegal use and track the distribution route of an illegal copy.

A digital watermark is embedded in the content data in a way that the watermark is perceptually invisible to users in order to prevent malicious attacks. However, the content data will be subject to various operations during the distribution and utilization, for instance, signal processing such as compression, various types of filtering, modification by users, or attacks on the watermark information. In such processes, a part of the digital watermark may be possibly altered or removed. Therefore the digital watermark should be robust enough to withstand such operations.

Various digital watermarking techniques have been developed in order to improve the robustness of digital watermarks. For instance, Japanese Patent Application Laid-Open 2000-13587 discloses a method for embedding a digital watermark with a high level of robustness while providing a degree of freedom for the process of embedding the digital watermark information. Such a digital watermarking technique adopts a method for embedding a digital watermark in high frequency components such as an edge or a region with a significant change in an image texture, according to the characteristics of the human visual system, and therefore the technique depends to a large degree on the individual content data and has limitations on the generality and flexibility so as to be difficult to improve the robustness of the embedded watermark against various operations which might be carried out on the contents data.

SUMMARY OF THE INVENTION

The present invention has been made based on these considerations, and an object thereof is to provide a digital watermarking technology which can embed a watermark with a high degree of robustness and reduce the detection error rate of the embedded watermark.

According to one aspect of the present invention, a digital watermark embedding method is provided. The method comprises scrambling a digital watermark to be embedded in host data and thereby generating a plurality of candidate watermarks, and evaluating the robustness of the respective candidate watermarks when the respective candidate watermarks are embedded in the host data, and obtaining watermarked host data in which one of the candidate watermarks is embedded with a high degree of robustness. According to this method, the watermark data can be converted to a data sequence with a high level of robustness depending on the host data before being embedded in the host data, and therefore the detection error rate in extracting the digital watermark can be reduced.

The host data are original data in which the digital watermark is to be embedded, for instance, data such as still image, video, audio or the like. The digital watermark to be embedded includes identification information, originator information, user information on the original data, and so on. Furthermore, a digest on the host data, that is data plainly representing the characteristics of the host data, can be embedded as the digital watermark. The robustness of the digital watermark means to what extent the digital watermark can survive any kinds of operations against the watermarked host data, for instance, signal processing such as compression or filtering.

The process of embedding the digital watermark utilizes a one-to-many mapping procedure which associates the original digital watermark with a plurality of candidate by converting the digital watermark in many different ways. The process of extracting the digital watermark includes the inverse mapping procedure and thereby obtains the original digital watermark from the scrambled watermark data. For this purpose, the extracting process may utilize a table which associates a plurality of the candidate watermarks with the original digital watermark. Moreover, the embedding process may utilize a scrambling function for generating a plurality of the candidate watermarks using a predefined initial value. In this case, the extracting process descrambles the extracted watermark using the same initial value and scrambling function as used in the scrambling.

According to another aspect of the present invention, a digital watermark embedding method is also provided. The method comprises generating a plurality of candidate locations of host data in which a digital watermark is embedded, and evaluating the robustness of the watermark when the watermark is embedded in the respective candidate locations, and obtaining watermarked host data in which the watermark is embedded with a high degree of robustness from among the candidate locations. According to this method, the digital watermark can robustly be embedded in a location found in the host data.

According to still another aspect of the present invention, an encoding apparatus is provided. The apparatus comprises a scrambling unit which scrambles a digital watermark to be embedded in host data and generates a plurality of candidate watermarks, an embedding unit which embeds the respective candidate watermarks in the host data and generates a plurality of candidate watermarked host data, an evaluating unit which evaluates the robustness of the respective candidate watermarks hidden in the respective candidate watermarked host data, and a selecting unit which selects and outputs one of the plurality of the candidate watermarked host data according to its evaluated robustness.

According to still another aspect of the present invention, an encoding apparatus is also provided. The apparatus comprises a location information generating unit which generates a plurality of candidate locations of host data in which a digital watermark is embedded, an embedding unit which embeds the watermark in the respective candidate locations of the host data and generates a plurality of candidate watermarked host data, an evaluating unit which evaluates the robustness of the digital watermark hidden in the respective candidate watermarked host data, and a selecting unit which selects and outputs one of the plurality of the candidate watermarked host data according to its evaluated robustness.

The scrambling unit may scramble the watermark by an operation using the identification data. This operation may be an operation for converting the watermark by a scrambling polynomial or other conversion formulas. The scrambling unit may scramble the watermark by convoluting the watermark using the identification data on the candidate watermark. By this convolutional operation, a variety of watermark candidates can be generated. This scrambling method may be used for generating the candidate watermark locations. Moreover, the plurality of the candidate locations may be generated by referring to a table which associates the identification data on each of the candidate locations with a random watermark location.

The scrambling unit may insert identification data necessary for descrambling in the candidate watermark generated by scrambling. After the scrambling by the scrambling unit, the identification data necessary for descrambling may be retained as a secret key. The identification data may be information for identifying the scrambling method, for instance, information for identifying the form of scrambling or scrambling/descrambling function. The identification data may contain the initial data necessary for descrambling. In this case, the decoding process can descramble the watermark using this identification data after extracting the scrambled watermark and thereby obtain the original watermark.

In any aspect of the above-mentioned encoding apparatus, the evaluating unit may evaluate the robustness by calculating signal-to-noise ratio (SNR) where the host data are regarded as a distortion in the watermark. Especially in the case of soft-input error correction code such as a turbo code, bit error rate (BER) can be reduced by selecting one of the candidates on criteria based on the SNR. The evaluating unit may evaluate the robustness by comparing a watermark decoded by making a hard decision with an actually embedded watermark. For this comparison, Hamming distance or Euclidean distance between the actual embedded watermark and the extracted watermark based on the hard decision may be evaluated. In this case, the larger the distance becomes, the larger the error rate becomes, and therefore the level of the robustness is judged to be low. According to this criterion, the candidate watermark which has the largest number of bits to be correctly decoded by the hard decision is selected. Especially in the case of a hard-input error correction code, the BER can be reduced by selecting the candidate according to the method in which such a hard decision result is compared with the actual embedded watermark.

The evaluating unit may evaluate the robustness after a utility operation is conducted on the watermarked host data. The utility operation is, for instance, signal processing such as compression, various filtering or the like, and geometric transformation such as scaling, rotation or the like. The evaluating unit may evaluate the robustness taking account of quantization errors caused by compressing the watermarked host data. In the case of evaluating the robustness on the basis of the SNR, the variance of a watermark extracted from the watermarked host data modified by the utility operation for the actually embedded watermark may be evaluated.

According to still another aspect of the present invention, a decoding apparatus is provided. The apparatus comprises an extracting unit which extracts a scrambled digital watermark from host data in which the digital watermark is supposed to have been embedded, and a descrambling unit which descrambles the scrambled watermark by performing convolution on the watermark using the identification data on the watermark. The descrambling unit may extract the identification data from a part of the scrambled watermark.

According to still another aspect of the present invention, a decoding apparatus is also provided. The apparatus comprises a location information generating unit which generates a plurality of candidate locations of host data in which a digital watermark is supposed to have been embedded, an extracting unit which extracts a plurality of candidate watermarks embedded in the host data according to the respective candidate locations, a checking unit which checks the plurality of the extracted candidate watermarks with an anticipated watermark, and a selecting unit which selects and outputs one of the candidate watermarks according to a checking result produced by the checking unit.

According to still another aspect of the present invention, a data structure readable and usable by a computer is provided. The data structure is a host data structure in which a digital watermark is hidden. The host data structure comprises an embedded watermark which is scrambled by a predefined scrambling method and identification data necessary for descrambling the scrambled watermark which are incorporated as a part of the scrambled watermark.

According to still another aspect of the present invention, a computer program executable by a computer is provided. The program comprises generating a plurality of candidate watermarks by scrambling a digital watermark to be embedded in host data, generating a plurality of candidate watermarked host data by embedding the respective candidate watermarks in the host data, evaluating the robustness of the respective candidate watermarks hidden in the respective candidate watermarked host data, and selecting one of the plurality of the candidate watermarked host data according to its evaluated robustness.

According to still another aspect of the present invention, a computer program is also provided. The program comprises generating a plurality of candidate locations of host data in which a digital watermark is embedded, generating a plurality of candidate watermarked host data by embedding the watermark in the respective candidate locations of the host data, evaluating the robustness of the watermark hidden in the respective candidate watermarked host data, and selecting one of the plurality of the candidate watermarked host data according to its evaluated robustness.

Moreover, any arbitrary replacement or substitution of the above-described structural components and the steps, expressions replaced or substituted in part or whole between a method and an apparatus as well as addition thereof, and expressions changed to a system, a computer program, a data structure, a storage medium, a transmission medium or the like are all effective as and are encompassed by the present invention.

This summary of the invention does not necessarily describe all necessary features, so that the invention may also be a sub-combination of these described features.

DETAILED DESCRIPTION OF THE INVENTION

The invention will now be described by reference to the preferred embodiments. This does not intend to limit the scope of the present invention, but to exemplify the invention.

Embodiment 1

Figure 1:
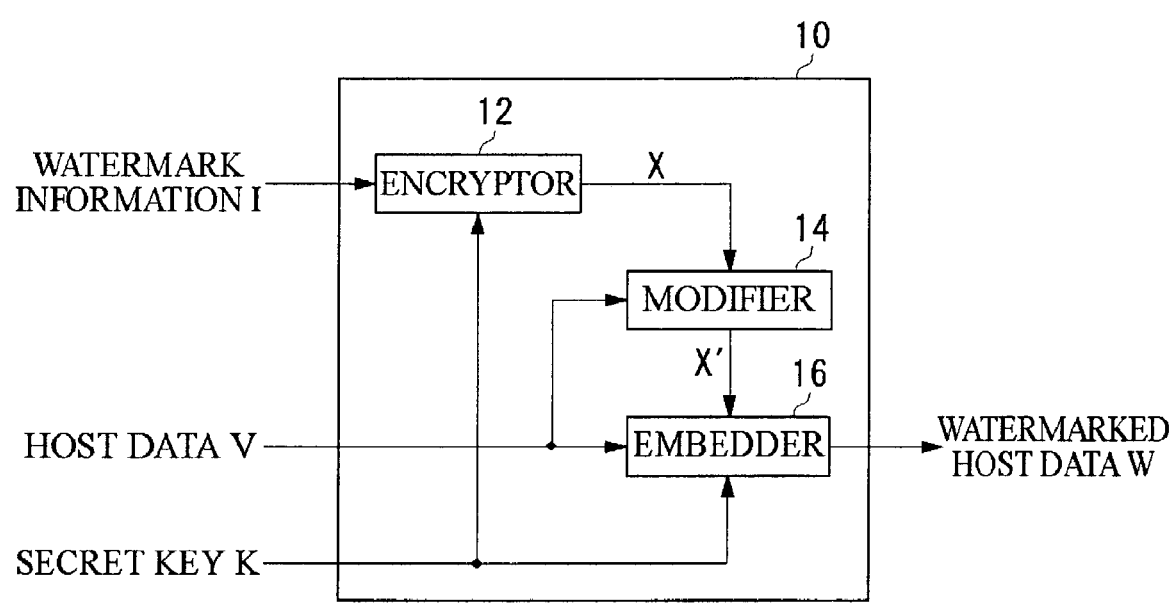
FIG. 1 shows a structure of an encoding apparatus according to Embodiment 1.

FIG. 1 shows a structure of an encoding apparatus 10 according to Embodiment 1. This structure can be realized by hardware, such as a CPU in arbitrary computers, memory and other LSIs, or by software, such as a program or the like loaded in the memory, which has functions for embedding digital watermarks. In the figure, functions, which are realized by combinations of such hardware and software, are shown by blocks. It should be understood by those skilled in the art that these functional blocks can be realized by various modes such as hardware only, software only or a combination thereof.

The encoding apparatus 10 performs a process for embedding watermark information I in host data V and outputs watermarked host data W. The host data V are, for instance, media data such as audio, still image, video or the like.

The watermark information I, for instance, includes copyright information such as identification, creator, or user information on the host data V, authentication information for detecting attacks on the host data V, timestamp information, and so forth.

An encryptor 12 encrypts the watermark information I to be embedded in the host data V using a secret key K and outputs a watermark X. When this encryption function is denoted by $f_0$, the encryption process can be represented by a transformation formula $X=f_0(I, K)$. If the watermark information I does not need to be encrypted, the configuration of the encryptor 12 may be omitted.

A modifier 14 scrambles the watermark X using the host data V and outputs a scrambled watermark X'. When this scrambling function is denoted by $f_2$, the scrambling process can be represented by a transformation formula $X'=f_2(X, V)$.

An embedder 16 embeds the scrambled watermark X' in the host data V using the secret key K and outputs watermarked host data W. When the watermarking function is denoted by $f_1$, the watermarking process can be represented by a transformation formula $W=f_1(V, X', K)$. If a watermarking method which does not depend on the secret key K is applied, the process is represented by $W=f_1(V, X')$ The modifier 14 and the embedder 16, in cooperation with each other, generate a plurality of the scrambled watermarks X' and embed each of them in the host data V, and thereby generate a plurality of candidate watermarked host data W and selects one of the candidates.

Figure 2:
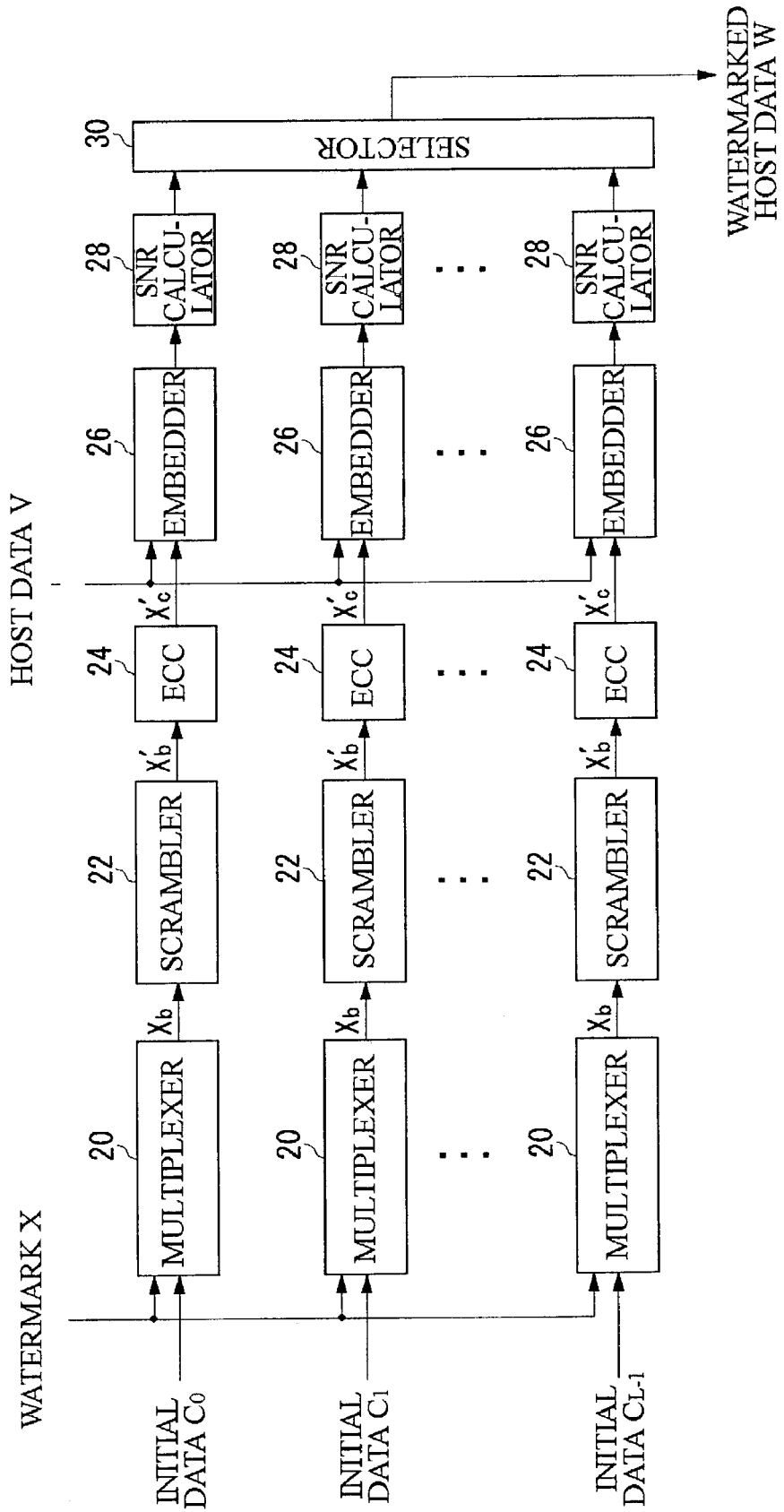
FIG. 2 is a block diagram of the modifier and the embedder of FIG. 1.

FIG. 2 is a block diagram of the modifier 14 and the embedder 16. L multiplexers 20 generate L kinds of bit sequences $X_b$ by adding initial data $C_0$ to $C_{L-1}$ to the head of the watermark X. L scramblers 22 scramble the L kinds of bit sequences respectively and generate L kinds of scrambled watermark X'. L error correction coders (ECCs) 24 generate watermarks $X'_c$ by adding the parity bits to the respective scrambled watermarks $X'_b$. The ECC 24 is an option for improving the detection rate of the watermark bits and therefore this configuration may be omitted according to the different applications.

L embedders 26 embed the L kinds of scrambled watermarks $X'_c$ in the host data V respectively and generate L kinds of candidate watermarked host data W. L SNR calculators 28 each evaluate the robustness of the watermark X hidden in the L kinds of candidate watermarked host data W.

A selector 30 selects one of the L kinds of candidate watermarked host data W for which the evaluated value of the robustness is the best, and outputs it as watermarked host data W.

Figure 3:
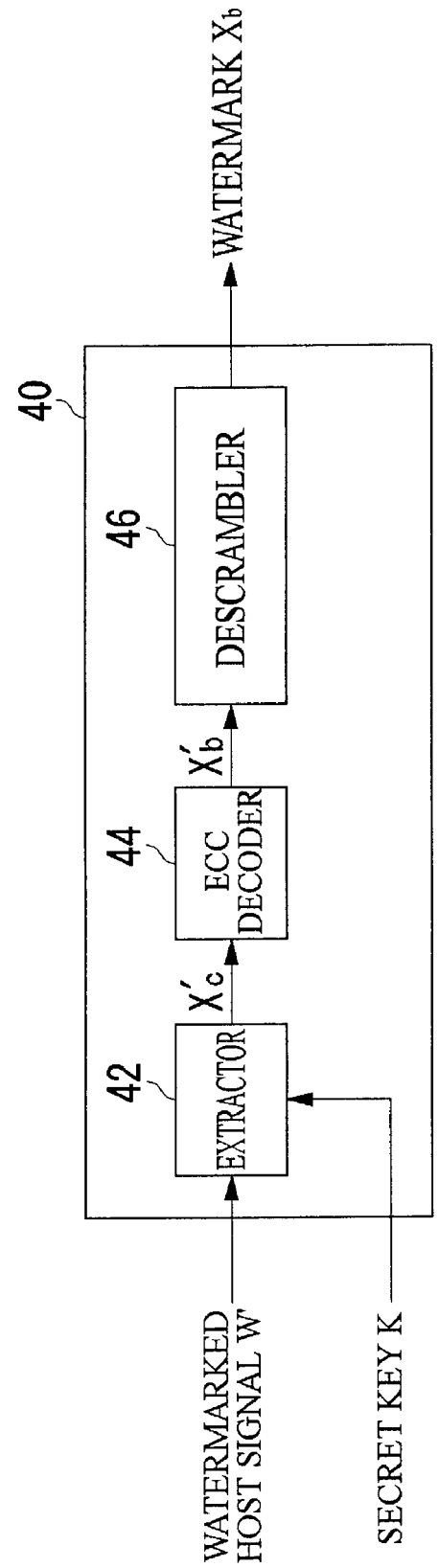
FIG. 3 is a block diagram of a decoding apparatus according to Embodiment 1.

FIG. 3 shows a block diagram of a decoding apparatus 40 according to Embodiment 1. The watermarked host data W in which a digital watermark has been embedded by the encoding apparatus 10 is distributed via a network and utilized in a computer. During these processes, the watermarked host data W are subject to operations such as compression and malicious attacks. In the case of image data, the data are subject to utility operations, for instance, signal processing such as JPEG compression, filtering, quantization, or color correction, or geometric transformation such as scaling, cropping, rotating, or parallel shifting, and also subject to illegal attacks such as removing or altering the digital watermark. Transformation by such operations adds a noise N to the watermarked host data W and the watermarked host data W with the noise N added is called a watermarked host signal W'. The decoding apparatus 40 performs a process for extracting the watermark X from the noisy watermarked host signal W'.

An extractor 42 extracts a watermark $X'_c$ from the watermarked host signal W' using the secret key K. An ECC decoder 44 corrects errors using the parity bits within the watermark $X'_c$ and thereby generates a watermark $X'_b$. A descrambler 46 descrambles the error corrected watermark $X'_b$ and thereby outputs a watermark $X_b$. The watermark $X_b$ is further decoded by the secret key K and the original watermark information I is obtained, although the last process is not shown in the figure.

The procedures of embedding and extracting a watermark by the above-mentioned configuration of the encoding apparatus 10 and the decoding apparatus 40 are now explained. FIG. 8 is a flowchart showing the watermark embedding procedure employed by the encoding apparatus 10. FIG. 4 to FIGS. 7A and 7B are referred to in the explanation of the flowchart. The multiplexer 20 inserts L kinds of initial data in the head of the watermark X encrypted by the encryptor 12 and thereby generates L kinds of code sequences (S10), and the scrambler 22 scrambles these code sequences and thereby generates L kinds of scrambled watermarks X' (S12).

Figure 4:
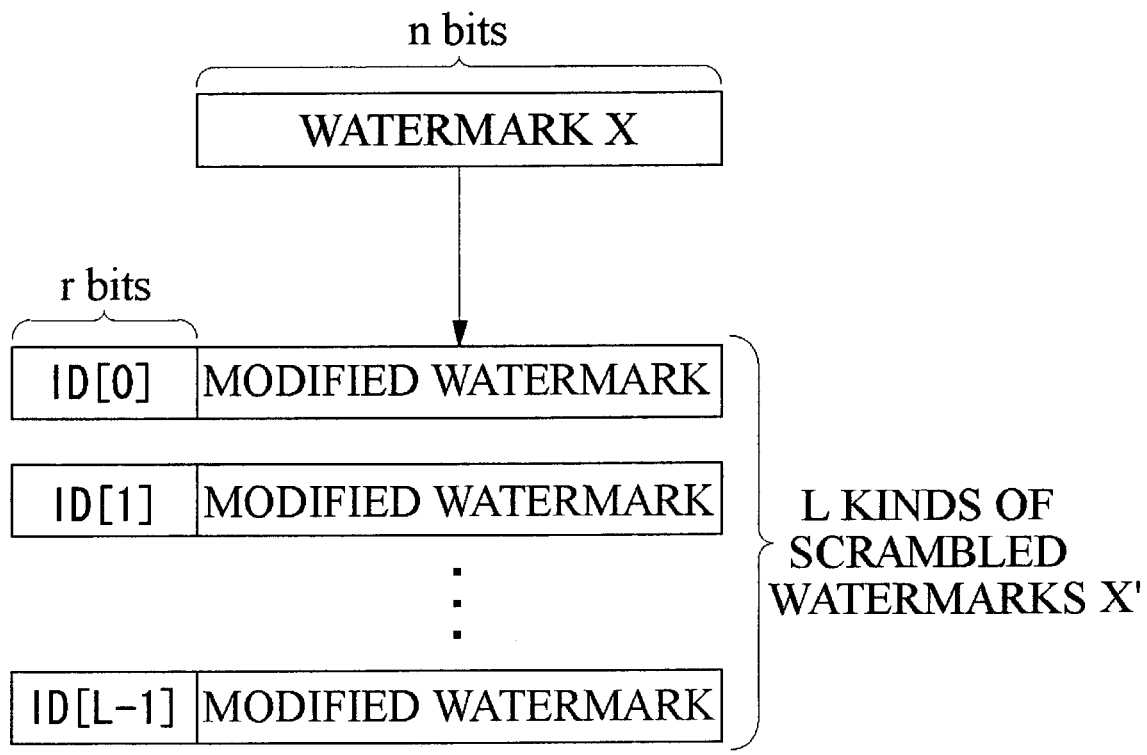
FIG. 4 shows a relationship between an original watermark and L kinds of scrambled watermarks.

FIG. 4 shows a relationship between the watermark X and the L kinds of scrambled watermarks X'. As identification data ID[0] to ID[L−1], r-bit redundant words are added to the head of n-bit watermark X and thus the L kinds of candidate watermarks are generated. At most $2^r$ kinds of candidates are generated. The bit sequences of the watermark X within the respective candidates are scrambled by a scrambling method that is described below.

As one of the scrambling methods, a guided scrambling (GS) technique, usually used for digital modulation for data transmission and magnetic recording, is adopted. This guided scrambling method generates L kinds of encoded sequences from a data sequence of a definite block length, and treats the generated sequences as candidates for an encoded sequence to be transmitted next. The method selects one which is most suitable to the characteristics of the transmission medium and transmits the selected one as a final encoded sequence.

By this method, a variety of candidates for the encoded sequence can be easily generated.

The multiplexer 20 and the scrambler 22 of the encoding apparatus 10 together function as a GS encoder. The GS encoder augments an n-bit source sequence D(x) with L kinds of r-bit redundant words $c_i$ (i=0, . . . , L−1) to generate L augmented source sequence $c_i x^n + D(x)$. The length of the augmented sequence is (n+r) bits. Next, the augmented source sequences are divided by the scrambling polynomial S(x) of degree N to obtain quotients $T_i(x)$ $$T_i(x) = Q_{s(x)}[(c_i x^n + D(x)) x^N] \quad (1)$$

where $Q_a[b]$ represents the quotient of a polynomial b divided by a polynomial a. The quotient set $\{T_0(x), \ldots, T_{L-1}(x)\}$ is a set of candidate scrambled code sequences. For each candidate, performance when the code sequence is really used is evaluated and the one for which the evaluated value is the best is selected as the final code sequence.

In decoding, the descrambler 46 of the decoding apparatus 40 functions as a GS decoder. The GS decoder multiplies the code sequence by S(x) and discards the lower n bits and upper r bits to obtain the original source sequence D(x).

The case in which the scrambling polynomial $S(x)=x^r+1$ is applied, is herein explained. When r is a positive number such that n mod r=0, the expression (1) can be represented by a convolutional operation as follows.

$$t_j = d_j \oplus c_i (j=0)$$

$$t_j = d_j \oplus t_{j-1} (j=1, \ldots, n/r-1)$$

where i=0, . . . , L−1 and $d_j$ represents a bit sequence obtained from the original source sequence D(x) being segmented by every r bit, and $t_j$ represents a bit sequence obtained from the code sequence $T_i(x)$ being segmented by every r bit. The r-bit redundant word $c_i$ is at the head of $T_i(x)$. Herein $\oplus$ denotes an exclusive-OR operation.

Figure 5:
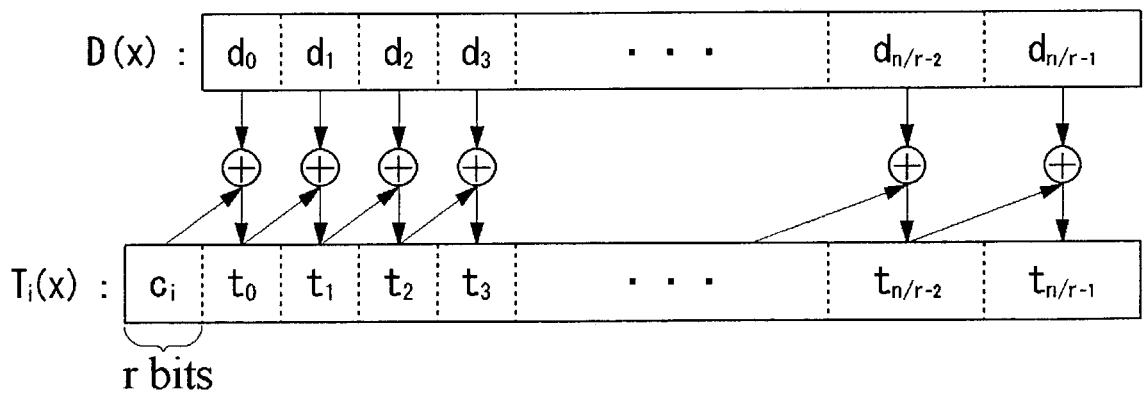
FIG. 5 explains a convolutional operation during an encoding process.

FIG. 5 explains the convolutional operation during the encoding process. For instance, let n be 6 and r be 2. The redundant word $c_0=(0,0)$ is added to D(x)=(1,0,1,0,0,1) and then a converted code sequence $T_0(x)$ is generated. By the above-mentioned convolutional operation in the encoding, $t_0=d_0 \oplus c_0=(1,0)\oplus(0,0)=(1,0)$, $t_1=d_1 \oplus t_0=(1,0)\oplus(1,0)=(0,0)$, and $t_2=d_2 \oplus t_1=(0,1)\oplus(0,0)=(0,1)$, and thus the converted code sequence $T_0=(0,0,1,0,0,0,0,1)$ is obtained. It is to be noted that the head 2-bit data of the converted code sequence $T_0$ is the redundant word $c_0$.

Likewise, for the redundant word $c_1=(0,1)$, $c_2=(1,0)$, $c_3=(1,1)$, the converted code sequences $T_1=(0,1,1,1,0,1,0,0)$, $T_2=(1,0,0,0,1,0,1,1)$, and $T_3=(1,1,0,1,1,1,1,0)$ are obtained, respectively.

In decoding, the original source sequence D(x) is obtained by the following convolutional operation.

$$d_j = t_j \oplus c_i (j=0)$$

$$d_j = t_j \oplus t_{j-1} (j=1, \ldots, n/r-1)$$

Figure 6:
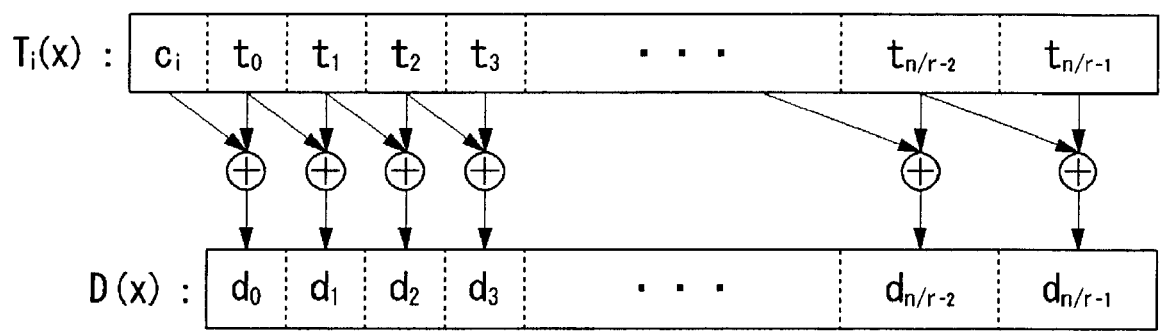
FIG. 6 explains a convolutional operation in a decoding process.

FIG. 6 explains the convolutional operation in the decoding process. When the converted code sequence $T_0=(0,0,1,0,0,0,0,1)$ is given in the above-mentioned example, the redundant word $c_0=(0,0)$ is obtained from the head 2-bit data of the sequence. By the above-mentioned convolutional operation in the decoding, $d_0=t_0 \oplus c_0=(1,0)\oplus(0,0)=(1,0)$, $d_1=t_1 \oplus t_0=(0,0)\oplus(1,0)=(1,0)$, and $d_2=t_2 \oplus t_1=(0,1)\oplus(0,0)=(0,1)$. For the other converted code sequences $T_1$, $T_2$ and $T_3$, the original source code D(x) is obtained likewise by this convolutional operation.

Referring to FIG. 8 again, the L kinds of watermarks X' generated by the scrambler 22 are augmented with parity bits by the ECC 24 and then the L kinds of parity added watermarks are embedded into the host data V by the embedder 26 (S14).

Figure 7A:
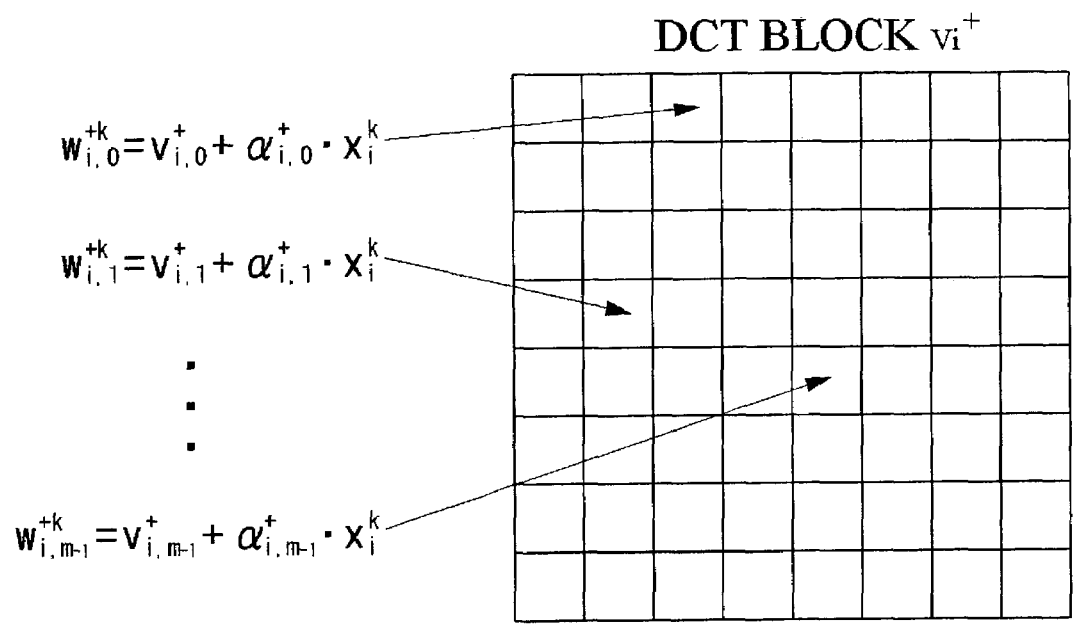
FIGS. 7A and 7B explain how a scrambled watermark is embedded.
Figure 7B:
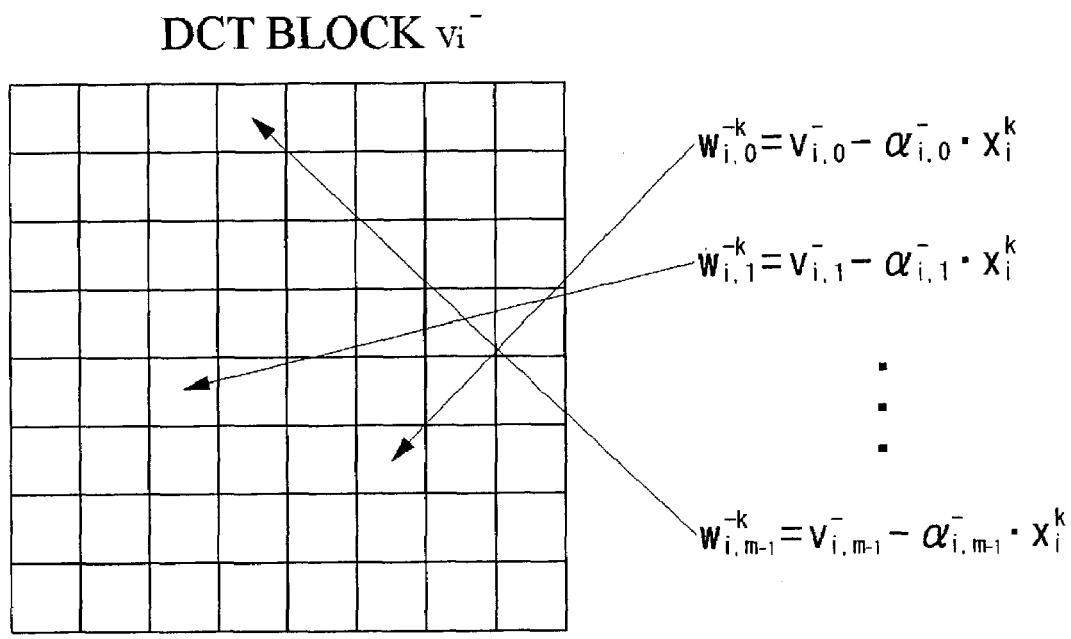
Figure 8:
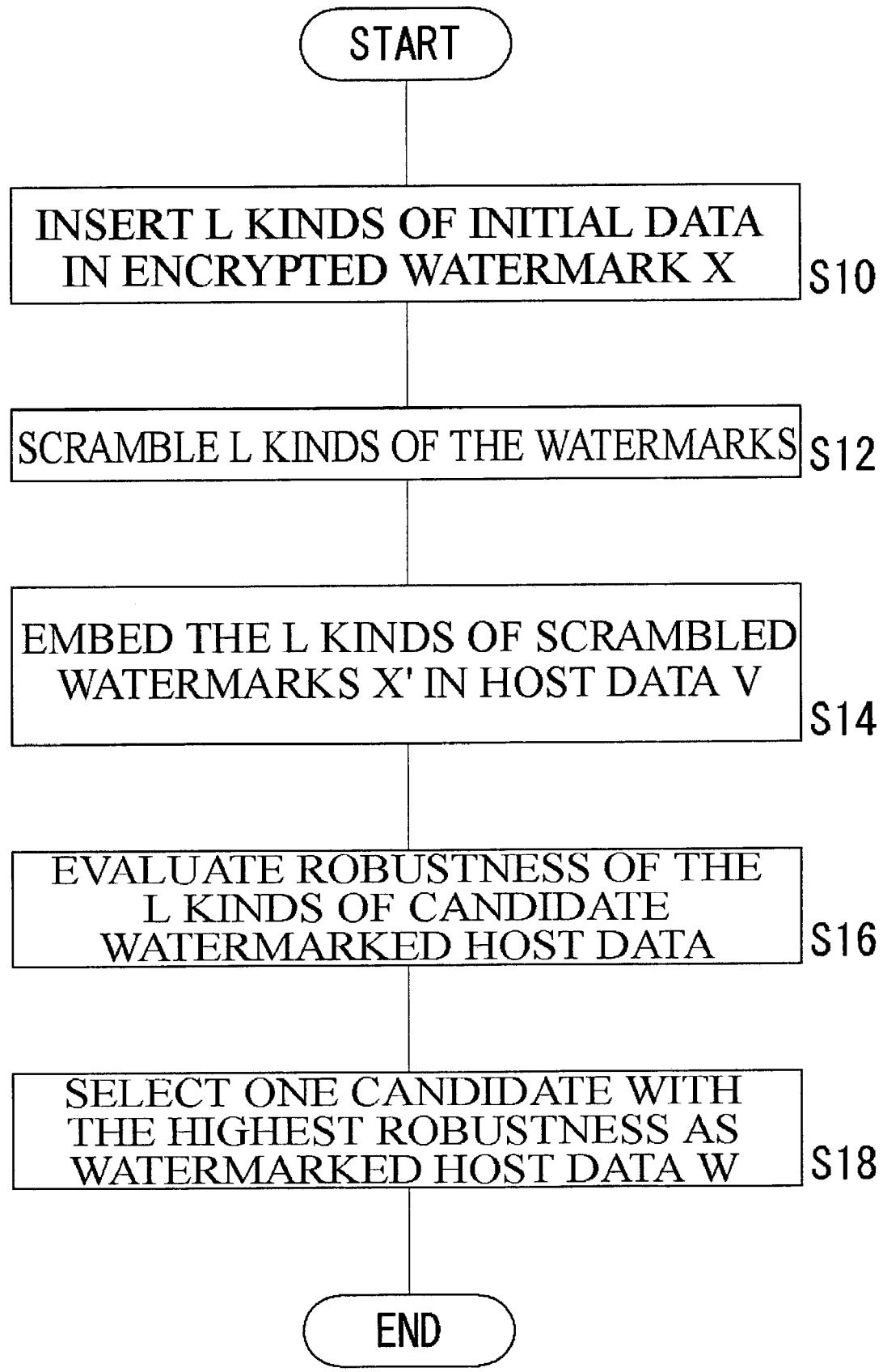
FIG. 8 is a flowchart showing a watermark embedding procedure employed by the encoding apparatus of FIG. 1.

FIGS. 7A and 7B explain how the scrambled watermark X' is embedded. Let L kinds of scrambled watermark X' be $x^0$, $x^1, \ldots, x^{L-1}$. The bit sequence of each candidate watermark is represented as follows. The head r-bit data indicate the identification data. Hereinafter the bit "0" after the scrambling is replaced by "−1" and then the subsequent processes are conducted.

$$x^0 = \{-1, \ldots, -1, -1, x_0^0, x_1^0, \ldots, x_{n-1}^0\}$$

$$x^1 = \{-1, \ldots, -1, 1, x_0^1, x_1^1, \ldots, x_{n-1}^1\}$$

$$\ldots$$

$$x^{L-1} = \{1, \ldots, 1, 1, x_0^{L-1}, x_1^{L-1}, \ldots, x_{n-1}^{L-1}\}$$

A pair of sample sets $(V^+, V^-)$ is defined as follows.

The samples in which an n-bit watermark is embedded are selected from the host data V. The sample sets $V^+$ and $V^-$ each contain n elements. It is to be noted that the host data V are represented by a set of samples over spatial domain, temporal domain, or frequency domain, for instance, the samples processed by Discrete Cosine Transform, Discrete Fourier Transform or Discrete Wavelet Transform.

$$V^+ = \{v_0^+, v_1^+, \ldots, v_{n-1}^+\}$$

$$V^- = \{v_0^-, v_1^-, \ldots, v_{n-1}^-\}$$

where each subset $v_i^+$ and $v_i^-$, an element of the sample sets $V^+$ and $V^-$, respectively, is composed of m samples of the host data V.

$$v_i^+ = \{v_{i,0}^+, v_{i,1}^+, \ldots, v_{i,m-1}^+\}$$

$$v_i^- = \{v_{i,0}^-, v_{i,1}^-, \ldots, v_{i,m-1}^-\}$$

The candidate watermarks $x^k$ (k=0, . . . , L−1) are embedded into the pair of the sample sets $(V^+, V^-)$ as follows and thus L kinds of candidate watermarked host data $W^k$ are generated.

$$w_{i,j}^{+k} = v_{i,j}^+ + \alpha_{i,j}^+ x_i^k$$
$$w_{i,j}^{-k} = v_{i,j}^- - \alpha_{i,j}^- x_i^k$$

where $$\alpha_{i,j}^+$$

and $$\alpha_{i,j}^-$$

are positive scaling parameters to reduce perceptual noise according to a human visual system. The parameters $$\alpha_{i,j}^+$$

and $$\alpha_{i,j}^-$$

may be positive values, using the secret key K, drawn from a certain probability distribution, for instance, a Gaussian distribution, a uniform distribution or the like. In this case, the robustness of the embedded watermark is degraded. However, the confidentiality of the embedded watermark is improved.

Thus, each bit $x_i^k$ of the k-th candidate watermark is redundantly embedded into m samples in each subsets $v_i^+$ and $v_i^-$. As the number m indicating the degree of the redundancy becomes greater, the possibility that the watermark bits are lost becomes lower and the detection error rate becomes smaller, whereas the number of bits that can be embedded into the host data decreases. Since the parameters $$\alpha_{i,j}^+$$

and $$\alpha_{i,j}^-$$

are values set per pixel so that visual degradation is not perceptible, in principle, the degradation of image quality will not be perceptible by human eyes even though the number m of pixels in which a watermark bit is embedded increases.

That is, the increase in m means the number of watermark bits which can be embedded decreases because of the limited region for watermarking, resulting in a decline in the ratio of the number of watermark bits to that of samples.

Each of the subsets $v_i^+$ and $v_i^-$ is, for example, a Discrete Cosine Transform (DCT) block into which a block of the host data V are transformed by DCT. The m samples in which the watermark bits are embedded are DCT coefficients in the DCT block. FIGS. 7A and 7B show how a watermark bit $x_i^k$ is embedded into the m DCT coefficients in a pair of DCT blocks $v_i^+$ and $v_i^-$ of 8×8 samples. The block pair $v_i^+$ and $v_i^-$ and the m DCT coefficients are selected on the basis of the secret key K.

Referring to FIG. 8 again, the SNR calculator 28 evaluates the robustness of the watermark $x^k$ for each of the L kinds of candidate watermarked host data $W^k$ (S16), and the selector 30 selects one candidate watermarked host data $W^k$ that has the highest degree of robustness as the final watermarked host data W (S18).

Before addressing a formula for evaluating its robustness, the manner in which a watermark X' is to be extracted, is considered, when the watermarked host data W are transformed by signal processing, image processing or the like. The distortion caused by the transformation of the watermarked host data W is regarded as a noise N. The watermarked host data W to which the noise N is added are called a watermarked host signal W'. The method for extracting the watermark X' from the watermarked host signal W' is now explained. A pair of the watermarked host signal sets (W'+, W'−) is defined, where the sets W'+ and W'− have n elements, respectively, as follows:

$$W'^+ = \{w_0'^+, w_1'^+, \ldots, w_{n-1}'^+\}$$
$$W'^- = \{w_0'^-, w_1'^-, \ldots, w_{n-1}'^-\}$$

where the subsets $$w_i'^+$$

and $$w_i'^-,$$

, each of which is the element of the watermarked host signal W'+ and W'−, have the m samples, respectively, corresponding to the location in which the watermark is embedded.

$$w_i'^+ = \{w_{i,0}'^+, w_{i,1}'^+, \ldots, w_{i,m-1}'^+\}$$
$$w_i'^- = \{w_{i,0}'^-, w_{i,1}'^-, \ldots, w_{i,m-1}'^-\}$$

The following decision value $z_i$ is calculated in order to determine the watermark bit $x_i^k$.

$$z_i = \sum_{j=0}^{m-1} (w_{i,j}'^+ - w_{i,j}'^-)$$
$$= \sum_{j=0}^{m-1} [(w_{i,j}^+ + n_{i,j}^+) - (w_{i,j}^- + n_{i,j}^-)]$$

-continued $$= \sum_{j=0}^{m-1} [(v_{i,j}^+ - v_{i,j}^-) + (\alpha_{i,j}^+ + \alpha_{i,j}^-)x_i^k + (n_{i,j}^+ - n_{i,j}^-)]$$

where $$\sum_{j=0}^{m-1} (v_{i,j}^+ - v_{i,j}^-)$$

conforms to a Gaussian distribution and approaches zero when the number m is large enough. Likewise, the noise term $$\sum_{j=0}^{m-1} (n_{i,j}^+ - n_{i,j}^-)$$

also approaches zero. Therefore, the decision value $z_i$ can be approximated by the value $$\sum_{j=0}^{m-1} [(\alpha_{i,j}^+ + \alpha_{i,j}^-)x_i^k].$$

. Since $$(\alpha_{i,j}^+ + \alpha_{i,j}^-)$$

is positive by definition, $z_i$ is positive if the watermark bit $x_i^k$ is 1, and $z_i$ is negative if the watermark bit $x_i^k$ is −1. Therefore the value of the watermark bit $x_i^k$ can be determined depending on whether $z_i$ is positive or negative.

The robustness of the embedded watermark is evaluated by regarding the host data V as a distortion to the watermark X and calculating the variance of an extracted watermark for the embedded watermark $x^k$. The smaller the variance is, the greater the robustness is. The signal-to-noise ratio (SNR) is evaluated by the following formula for the pair of candidate watermarked host data $(W^{+k}, W^{-k})$ and the optimal candidate K is selected.

$K = \mathrm{argmax}_k(P_k/(2\sigma_k^2))$ $$P_k = \sum_{i=0}^{n-1} \left| \sum_{j=0}^{m-1} (w_{i,j}^{+k} - w_{i,j}^{-k}) \right|^2 / n$$

$$\sigma_k^2 = \sum_{i=0}^{n-1} \left| \sum_{j=0}^{m-1} (w_{i,j}^{+k} - w_{i,j}^{-k}) - P_k^{1/2} x_i^k \right|^2 / n$$

Since the above-mentioned decision value $z_i$ to determine whether the watermark bit $x_i^k$ is 1 or −1 is given as $$z_i = \sum_{j=0}^{m-1} (w_{i,j}^{+k} - w_{i,j}^{-k})$$

before the noise is added to the watermarked host data W, the variance $\sigma_k^2$ can be regarded as the average power of the difference between the watermark bit determined by the decision value $z_i$ and the actual embedded watermark bit $x_i^k$ amplified by $P_k^{1/2}$ for i=0, ..., n−1. $P_k$ can be regarded as the average power of the decision value $z_i$ for i=0, ..., n−1. Therefore, the smaller the Euclidian distance between the embedded watermark and the extracted watermark is and the larger the power of the decision value to determine the watermark bit is, the larger $P_k/(2\sigma_k^2)$ becomes. In other words, by selecting the candidate having the largest $P_k/(2\sigma_k^2)$, the candidate having the smallest detection errors in extracting the watermark bits can be selected.

In respect of the decision value $z_i$, if $$v_{i,j}^+ > v_{i,j}^-$$

and $x_i^k = 1$, $z_i \gg 0$, and if $$v_{i,j}^+ < v_{i,j}^-$$

and $x_i^k = -1$, $z_i \ll 0$. This means that by selecting the optimal candidate watermark $x^k$ according to the above-mentioned evaluation, the original watermark bit $x_i$ is changed to $x_i'$ so that $x_i' = 1$ if $v_{i,j}^+ > v_{i,j}^-$ and $x_i' = -1$ if $$v_{i,j}^+ < v_{i,j}^-.$$

. This is a guiding rule used in the GS method and thereby the response of the decision value $z_i$ is improved.

When the extractor 42 of the decoding apparatus 40 receives the noisy watermarked host signal W', the extractor 42 calculates the decision value $z_i$ as follows:

$$z_i = \sum_{j=0}^{m-1} (w_{i,j}^{'+} - w_{i,j}^{'-})$$

$$= \sum_{j=0}^{m-1} [(w_{i,j}^+ + n^{+i,j}) - (w_{i,j}^- + n_{i,j}^-)]$$

$$= \sum_{j=0}^{m-1} [(v_{i,j}^+ + v_{i,j}^-) - (\alpha_{i,j}^+ + \alpha_{i,j}^-)x_i' + (n_{i,j}^+ + n_{i,j}^-)]$$

If the ECC decoder 44 is configured as a hard-input decoder, whether watermark bit x' is −1 or 1 is determined depending on whether the decision value $z_i$ is negative or positive, and sent to the ECC decoder 44. When the ECC decoder 44 is configured as a soft-input decoder, the decision value $z_i$ is directly sent to the ECC decoder 44 without any hard decision on whether the watermark bit is −1 or 1.

Furthermore, the extracted watermark X' is error corrected by the ECC decoder 44 and descrambled by the descrambler 46 and thereby the original watermark X is obtained.

As stated above, according to this embodiment, when media data such as image or audio to be watermarked are given, the watermark bit sequence can be converted to a bit sequence prone to be adhered to the media data and thereafter embedded. Therefore it is possible to make the digital watermark robust against signal processing, geometric transform, compression, attacks and so on, and thereby the detection accuracy in extracting the watermark is highly improved.

In the above-mentioned embodiment, L multiplexers 20, scramblers 22, ECCs 24, embedders 26, and SNR calculators 28 are provided in parallel to generate L kinds of candidate watermarks, however, a plurality of these components can be unified in a single structure and L kinds of candidate watermarks may be sequentially generated and evaluated, and thereby an optimal candidate may be selected.

Figure 9:
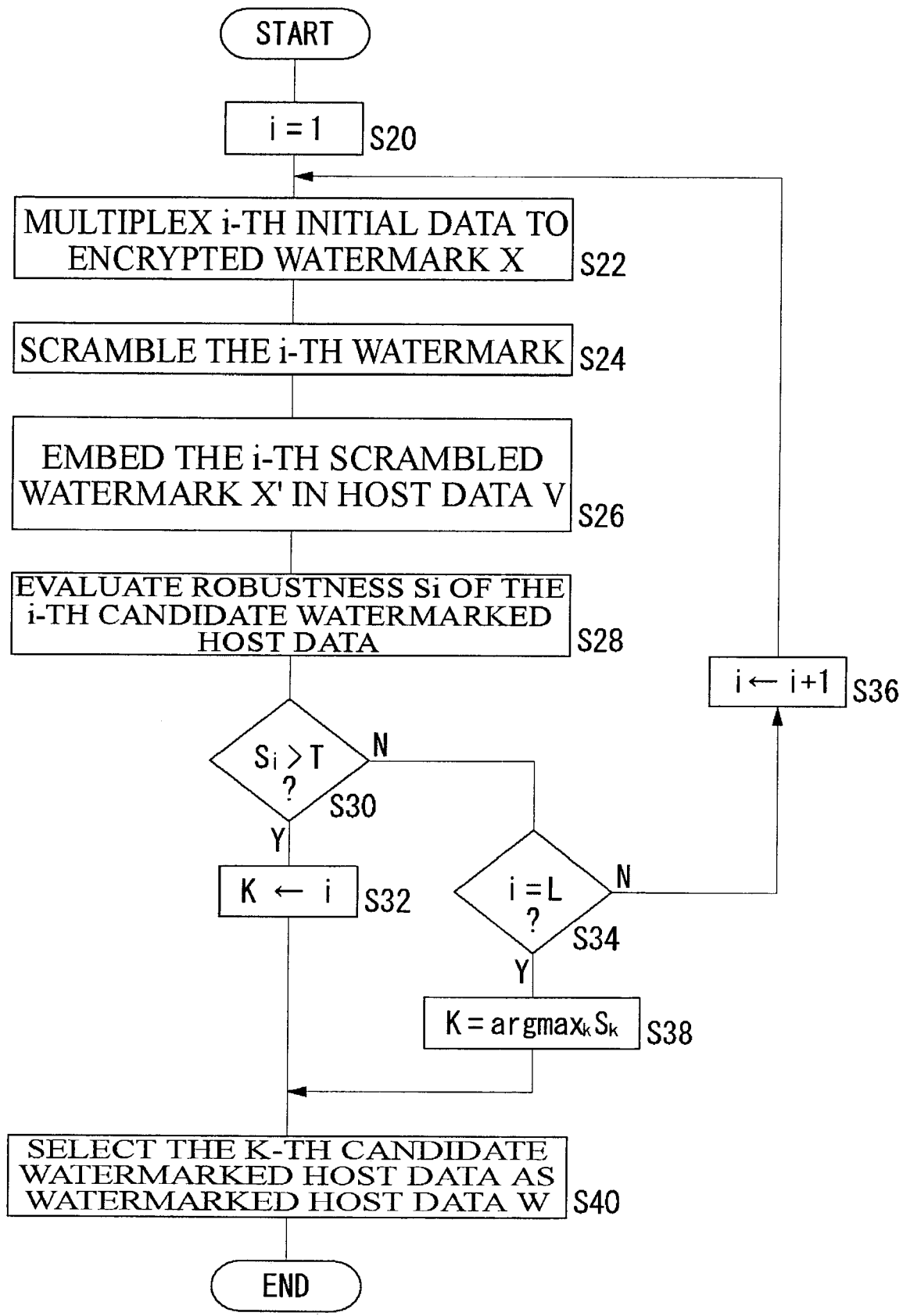
FIG. 9 is a flowchart showing another watermark embedding procedure employed by the encoding apparatus of FIG. 1.

FIG. 9 is a flowchart to explain such a sequential watermark embedding procedure. A variable i is set to 1 (S20). The multiplexer 20 inserts i-th initial data in the head of the watermark X encrypted by the encryptor 12 and generates a code sequence (S22), and the scrambler 22 scrambles the code sequence and generates i-th scrambled watermark X' (S24). The ECC 24, if necessary, adds a parity for error correction to the i-th scrambled watermark X' generated by the scrambler 22, and the embedder 26 embeds it in the host data V (S26). The SNR calculator 28 evaluates robustness $S_i$, that is, tolerance of the watermark $x_i$ embedded in the i-th candidate watermarked host data (S28).

The selector 30 determines whether the robustness $S_i$ is greater than a threshold value T (S30). If the robustness $S_i$ is greater than the threshold value T (Y of S30), the current value of the variable i is assigned to a variable K (S32), and the K-th candidate watermarked host data is selected as the final watermarked host data W (S40). If the robustness $S_i$ is not greater than the threshold value T (N of S30) and if the current value of the variable i is equal to L (Y of S34), the index k of the greatest robustness $S_k$ evaluated so far is assigned to the variable K (S38), and the K-th candidate watermarked host data is selected as the final host data W (S40) If the current value of the variable i is less than L (N of S34), the variable i is incremented by 1 (S36), and the procedure goes back to the step S22.

By this iterative process, once a candidate with a higher level of robustness than a desired level is obtained, the candidate can be selected as the final watermarked host data W. If such a candidate is not generated, L kinds of candidate watermarked host data are generated and one candidate with the highest level of the robustness can be selected as the final watermarked host data W.

Embodiment 2

Figure 10:
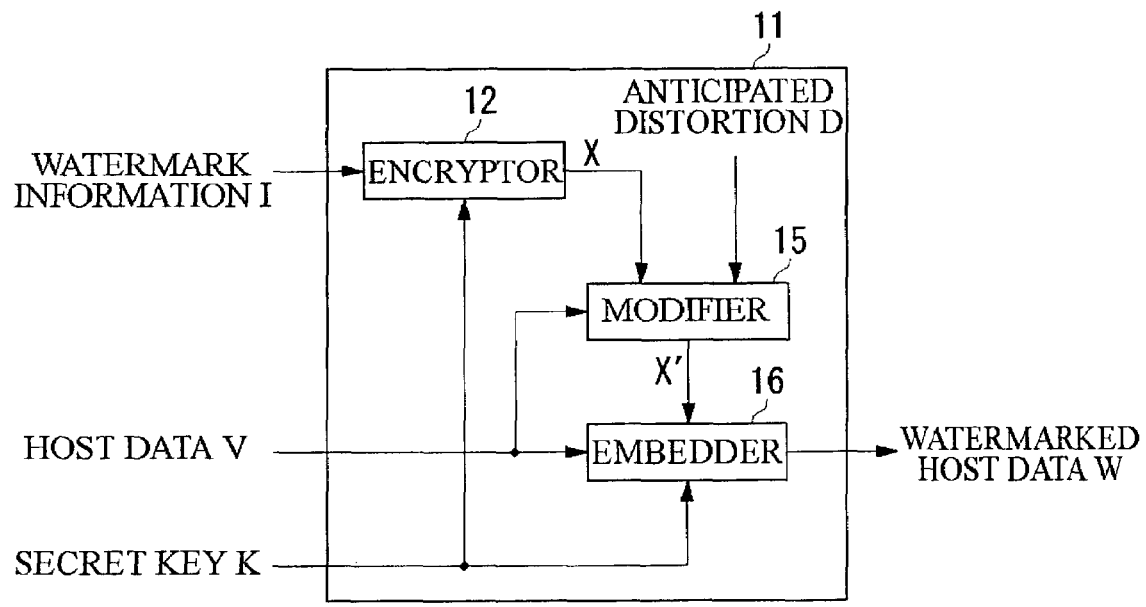
FIG. 10 is a block diagram of an encoding apparatus according to Embodiment 2.

FIG. 10 shows a block diagram of an encoding apparatus 11 according to Embodiment 2. In the present embodiment, a specific process such as compression to be performed on host data V in which a watermark is embedded is anticipated beforehand, and the effect by the specific process is considered when the watermark is embedded and thereby the robustness of the watermark is ensured to a distortion caused by the specific process. The same structures as Embodiment 1 are denoted by the same numerals and the explanation thereof is omitted, and the structures and behaviors different from Embodiment 1 are explained below.

Figure 11:
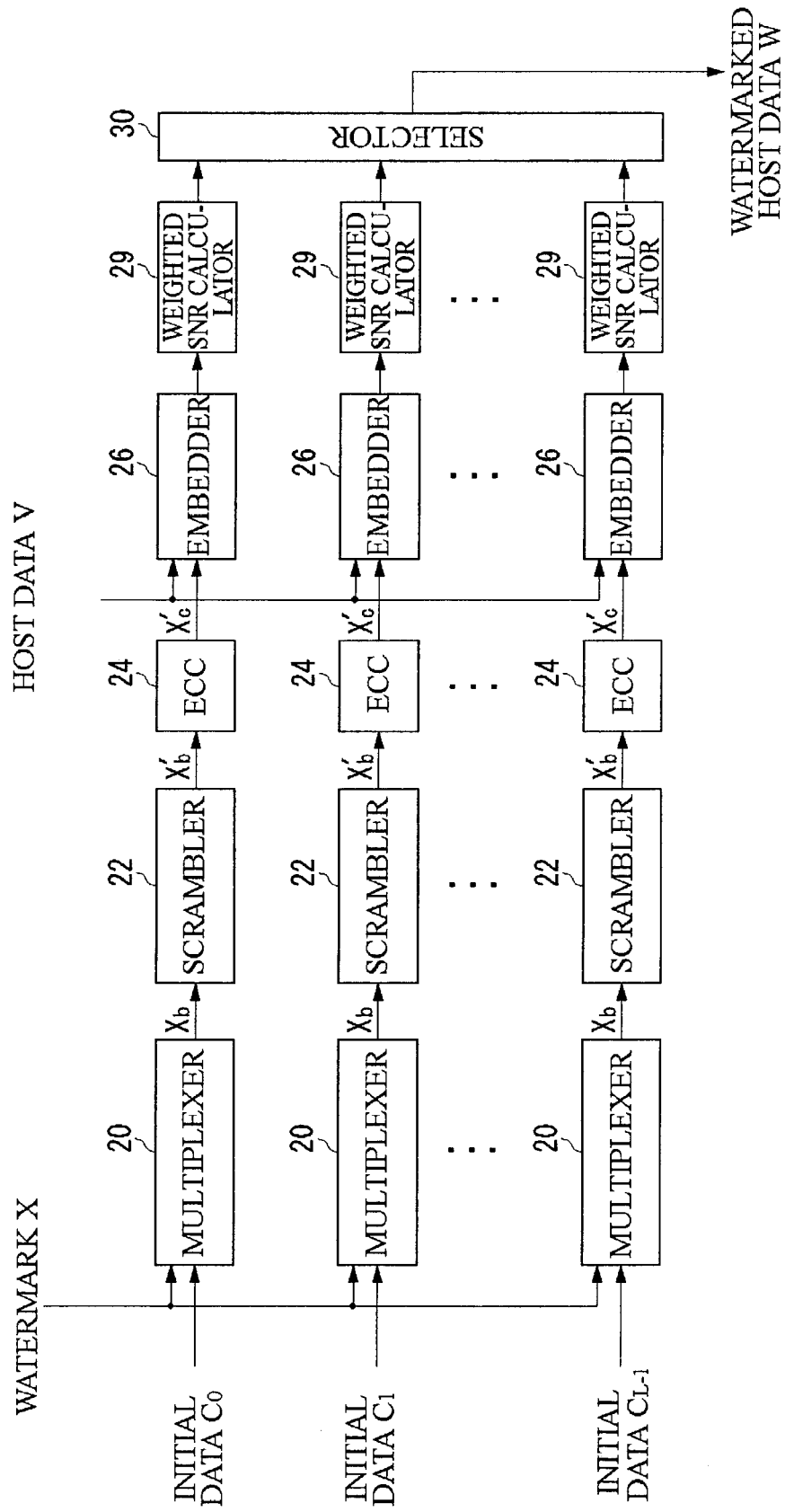
FIG. 11 is a block diagram of the modifier and the embedder of FIG. 10.

In scrambling a watermark X, a modifier 15 selects a bit sequence of the watermark with a high level of robustness in respect of a distortion D caused by the specific process to be performed on the host data V and outputs a scrambled watermark X'. FIG. 11 is a block diagram of the modifier 15 and the embedder 16. Weighed SNR calculators 29 evaluate the robustness of the watermark X in candidate watermarked host data W in which L kinds of scrambled watermark X'$_c$ exist, taking account of the anticipated distortion D caused by the specific process. Concretely, for evaluating the robustness on the basis of the variance between the embedded watermark and an extracted watermark, the following weighted variance is used, in which the distortion by the specific process to be performed on the watermarked host data W is considered.

$$K = \mathrm{argmax}_k(P_k/(2\sigma_k^2))$$

$$P_k = \sum_{i=0}^{n-1} \left| \sum_{j=0}^{m-1} (w_{i,j}^{*+k} - w_{i,j}^{*-k}) \right|^2 / n$$

$$\sigma_k^2 = \sum_{i=0}^{n-1} \left| \sum_{j=0}^{m-1} (w_{i,j}^{*+k} - w_{i,j}^{*-k}) - P_k^{1/2} \cdot x_i^k \right|^2 / n$$

where $$w_{i,j}^{*+k}$$

and $$w_{i,j}^{*-k}$$

are the watermarked host data W on which the specific process has been performed. If the specific process is known in advance and it is, for instance, JPEG compression, $w^{*+k}_{i,j}$ and $w^{*-k}_{i,j}$ can be calculated by the following formula using a quantization table in JPEG.

$$w_{i,j}^{*+k} = \mathrm{round}(w_{i,j}^{+k}/q_{i,j})q_{i,j}$$

$$w_{i,j}^{*-k} = \mathrm{round}(w_{i,j}^{-k}/q_{i,j})q_{i,j}$$

where $q_{i,j}$ is the value of the location (i,j) in the quantization table in JPEG and round( ) is a round function used in the JPEG compression.

According to the present embodiment, since a specific process to be performed on the watermarked host data is anticipated in evaluating the robustness and the bit sequence of the watermark with the highest level of the robustness is selected, the watermark that is highly tolerant toward the specific process can be generated.

Embodiment 3

Figure 12:
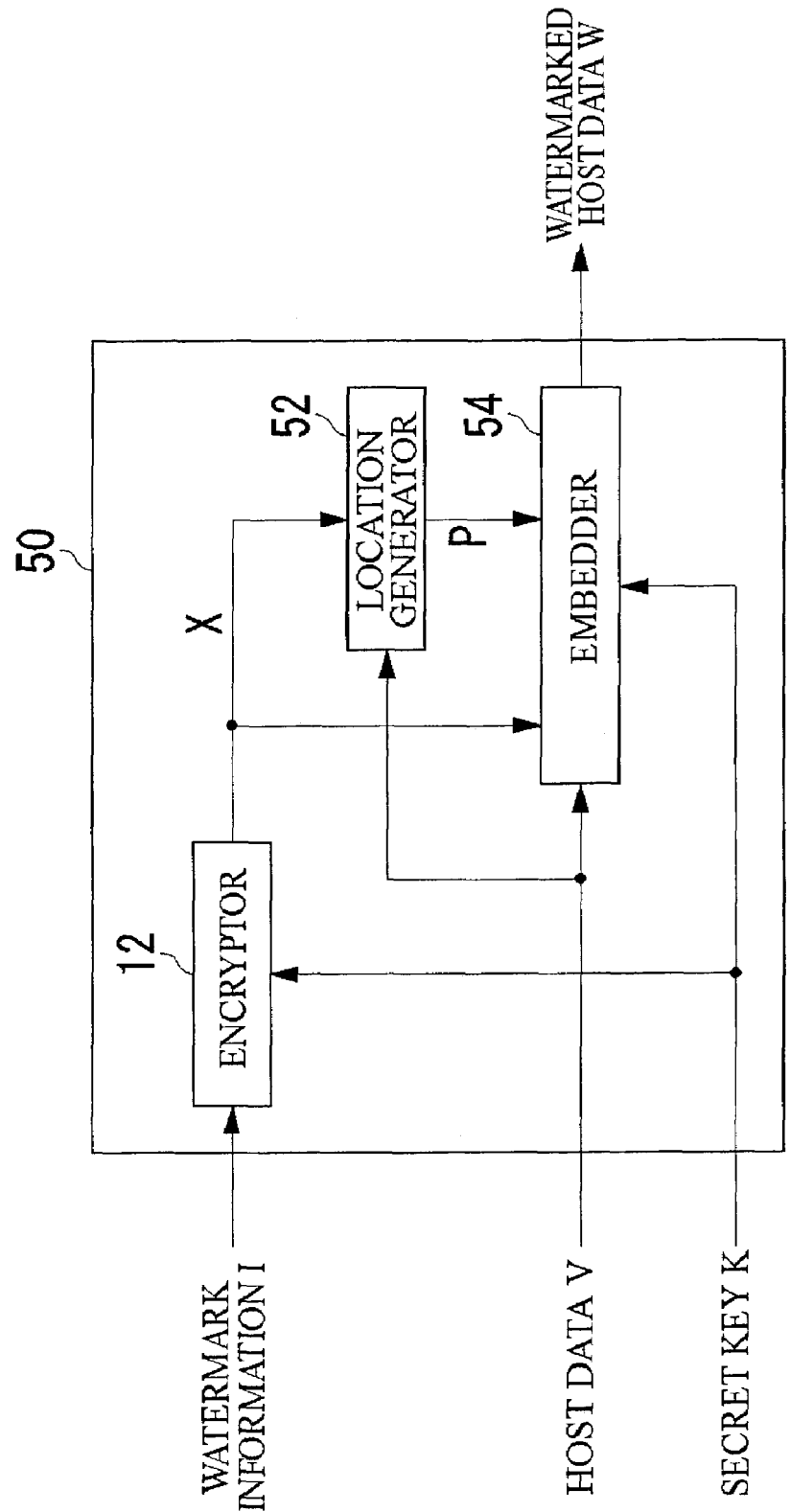
FIG. 12 is a block diagram of an encoding apparatus according to Embodiment 3.

FIG. 12 shows a block diagram of an encoding apparatus 50 according to Embodiment 3. The encoding apparatus 50 embeds a watermark X in a plurality of candidate locations of host data V and selects one of candidates for the watermarked host data with a high level of robustness and outputs it as a final watermarked host data W. The same structures as Embodiment 1 are denoted by the same numerals and the explanation thereof is omitted, and the structures and behaviors different from Embodiment 1 are explained below.

A location generator 52 generates a scrambled watermark location P and an embedder 54 embeds the watermark X in the watermark location P of the host data V and outputs the watermarked host data W. The location generator 52 and the embedder 54, in cooperation with each other, generate a plurality of the watermark locations P, using a secret key K, and embed the watermark X in the respective watermark locations P, and thereby generate a plurality of candidate watermarked host data W and select one of the candidates.

Figure 13:
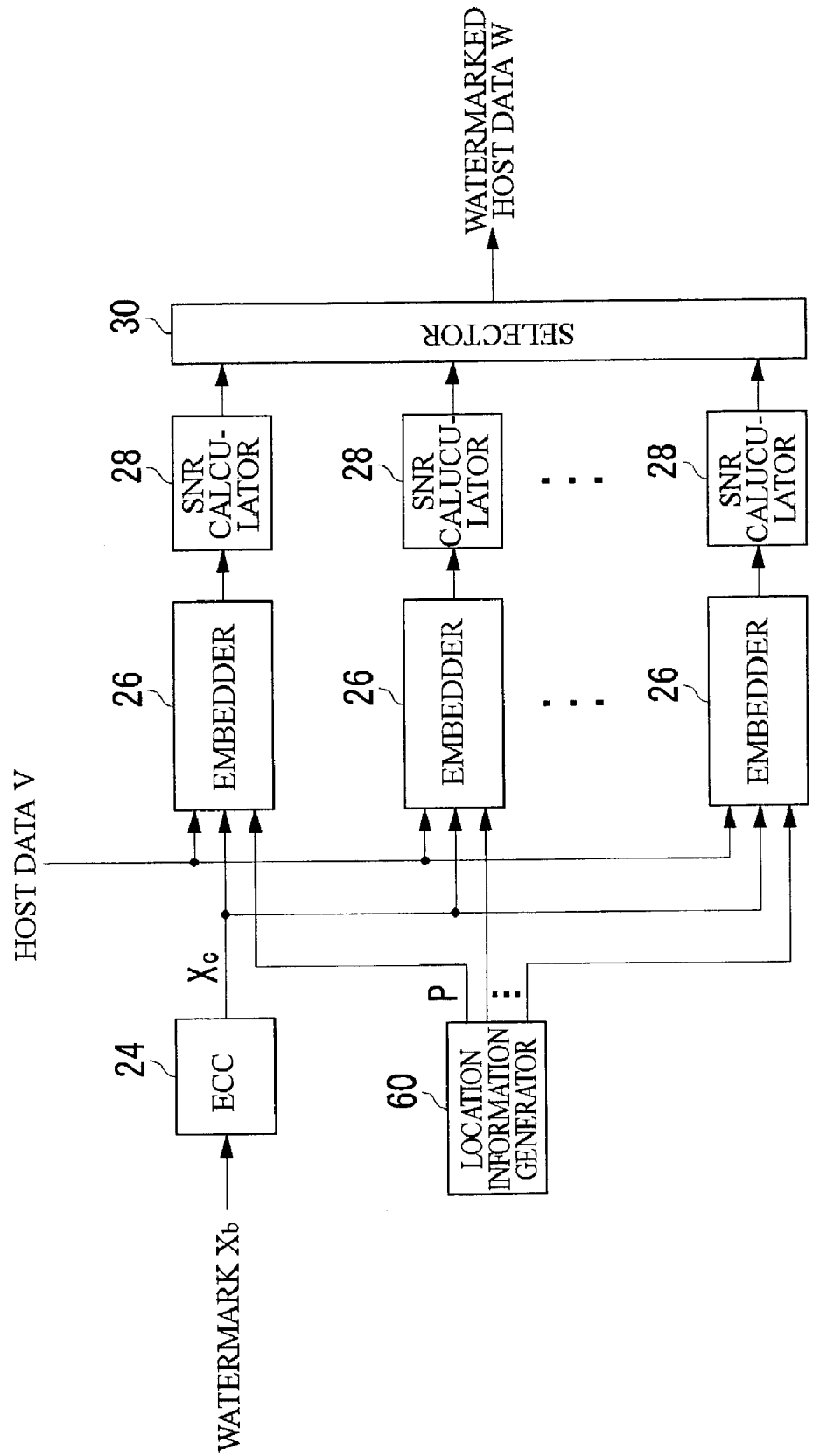
FIG. 13 is a block diagram of the location generator and the embedder of FIG. 12.

FIG. 13 is a block diagram of the location generator 52 and the embedder 54. An ECC 24 generates a watermark $X_c$ with a parity added to a watermark $X_b$. A location information generator 60 generates L candidate watermark locations P of the host data V. L embedders 26 embed the watermark $X_c$ to the respective candidate watermark locations P and generate L kinds of candidate watermarked host data W.

The location information generator 60 generates L candidate watermark locations P scrambled by the GS method. L kinds of initial data $C_0$ to $C_{L-1}$ are provided for an initial watermark location P* and the initial watermark location P* is scrambled by the method similar to the one described in Embodiment 1.

Figure 14:
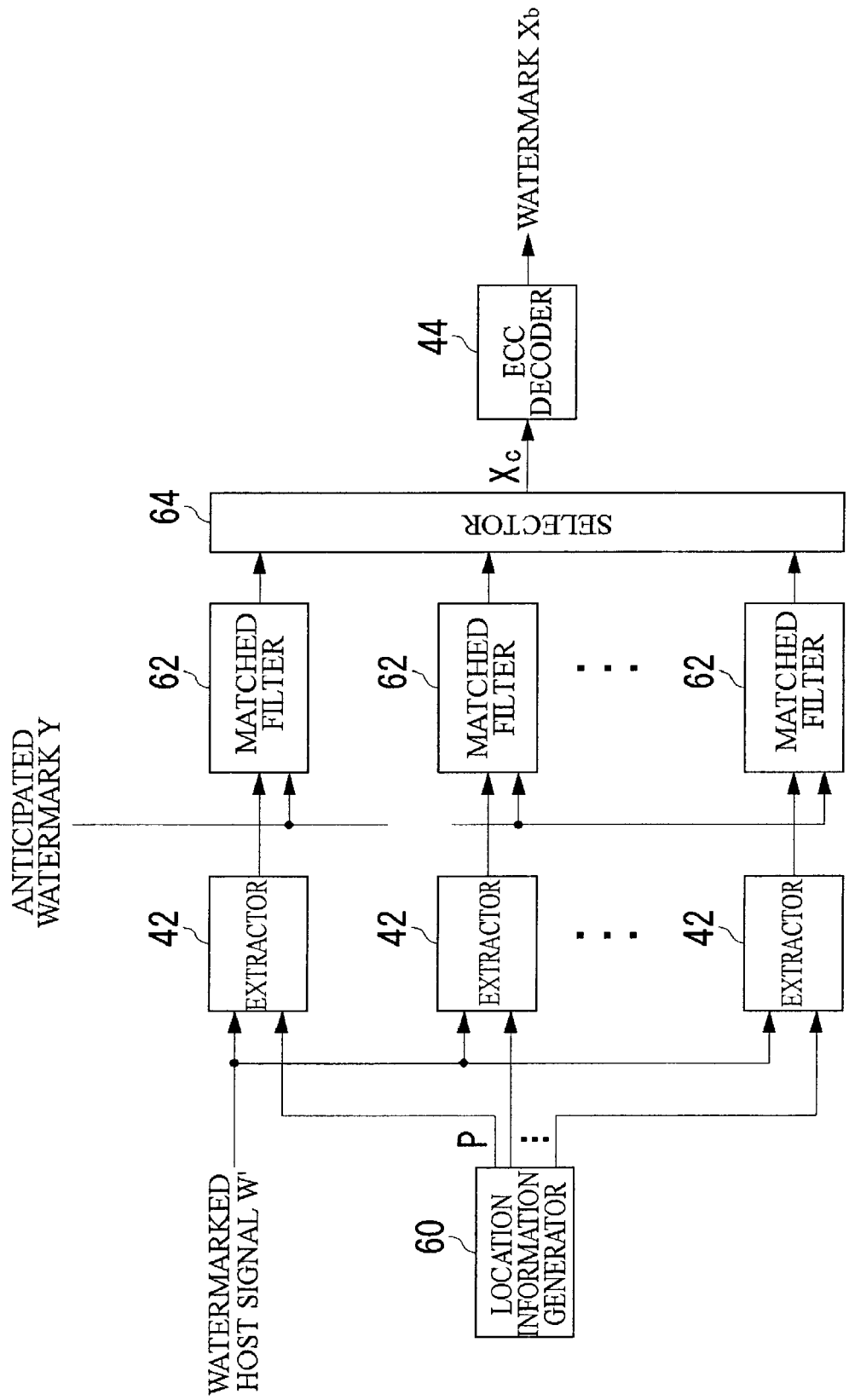
FIG. 14 is a block diagram of a decoding apparatus according to Embodiment 3.

FIG. 14 shows a block diagram of a decoding apparatus according to Embodiment 3. The decoding apparatus extracts an embedded watermark $X_c$ from a watermarked host signal W' and performs error correction on the watermark $X_c$ and thereby obtains the error corrected watermark $X_b$. The location information generator 60 generates L candidate watermark locations P, just as the location information generator 60 in the encoding apparatus 50 shown in FIG. 13 does. L extractors 42 extract L kinds of candidate watermarks $X_c$ hidden in the watermarked host signal W' from the L candidate watermark locations P given by the location information generator 60. Only one among the L candidate watermark locations P is a correct watermark location. A matched filter 62 computes the correlation between the L candidate watermarks $X_c$ and an anticipated watermark Y. A selector 64 selects one watermark $X_c$ with the highest degree of the correlation and thus the watermark $X_c$ in the correct watermark location is obtained. The obtained watermark $X_c$ is error corrected by an ECC decoder 44.

The anticipated watermark Y is given if the watermark X to be embedded in the host data V is known. For instance, there is the case in which the originator of the host data V is known and it is to be confirmed that the watermark X on the originator has been embedded in the host data V. In general, the present embodiment can be applied to the case in which the embedded watermark information is known beforehand but its watermark location is only given as some candidates.

According to the present embodiment, when media data to be watermarked are given, the location in which a given watermark is to be stickily embedded can be detected depending on the media data, and the robustness of the watermark embedded in the location can be improved.

Embodiment 4

In Embodiments 1 to 3, an error correction code is used for correcting errors in the watermark X. In the respect that the decision value $z_i$ is used for detecting watermark bit $x^k_i$ in the process of decoding, it can be understood that a soft-decision decoding, which utilizes auxiliary information indicating the reliability of decoded bits for the soft-decision, is effective for detecting the watermark. In the present embodiment, a turbo code is used as such a soft-decision decoding method, and the ECC 24 of the encoding apparatus and the ECC decoder 44 of the decoding apparatus are replaced by a turbo encoder 70 of FIG. 15 and a turbo decoder 90 of FIG. 16 respectively.

Figure 15:
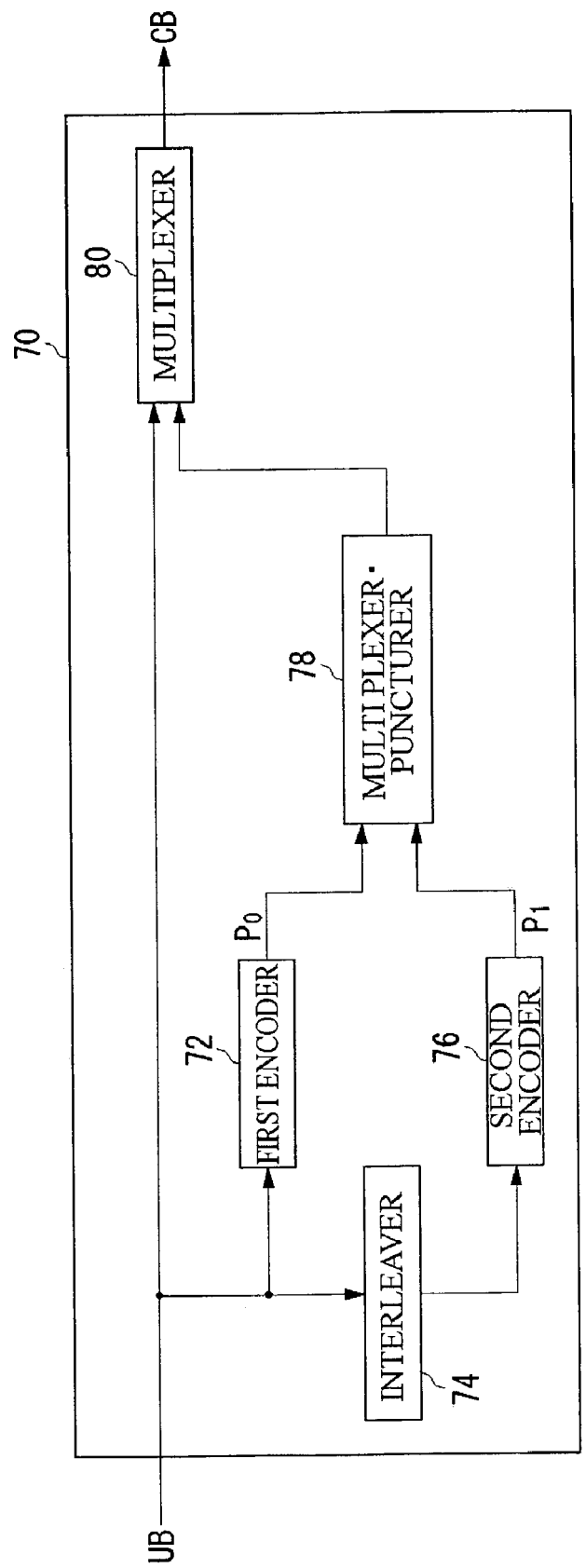
FIG. 15 is a block diagram of a turbo encoder in an encoding apparatus according to Embodiment 4.

Referring to FIG. 15, the structure and behavior of the turbo encoder 70 is explained. A user bit sequence UB, input data to be encoded, is input to the first encoder 72 which generates a parity bit sequence $P_0$. The user bit sequence UB is put in random order by an interleaver 74 and input to the second encoder 76 which generates another parity bit sequence $P_1$. The two parity bit sequences $P_0$ and $P_1$ are punctured and multiplexed by a multiplexer and puncturer 78 and then multiplexed with the user bit sequence UB by a multiplexer 80 and finally output as a coded bit CB. It is to be noted that the puncturing process is an optional process to increase the number of the watermark bits and the process can be omitted if it is not necessary.

Figure 16:
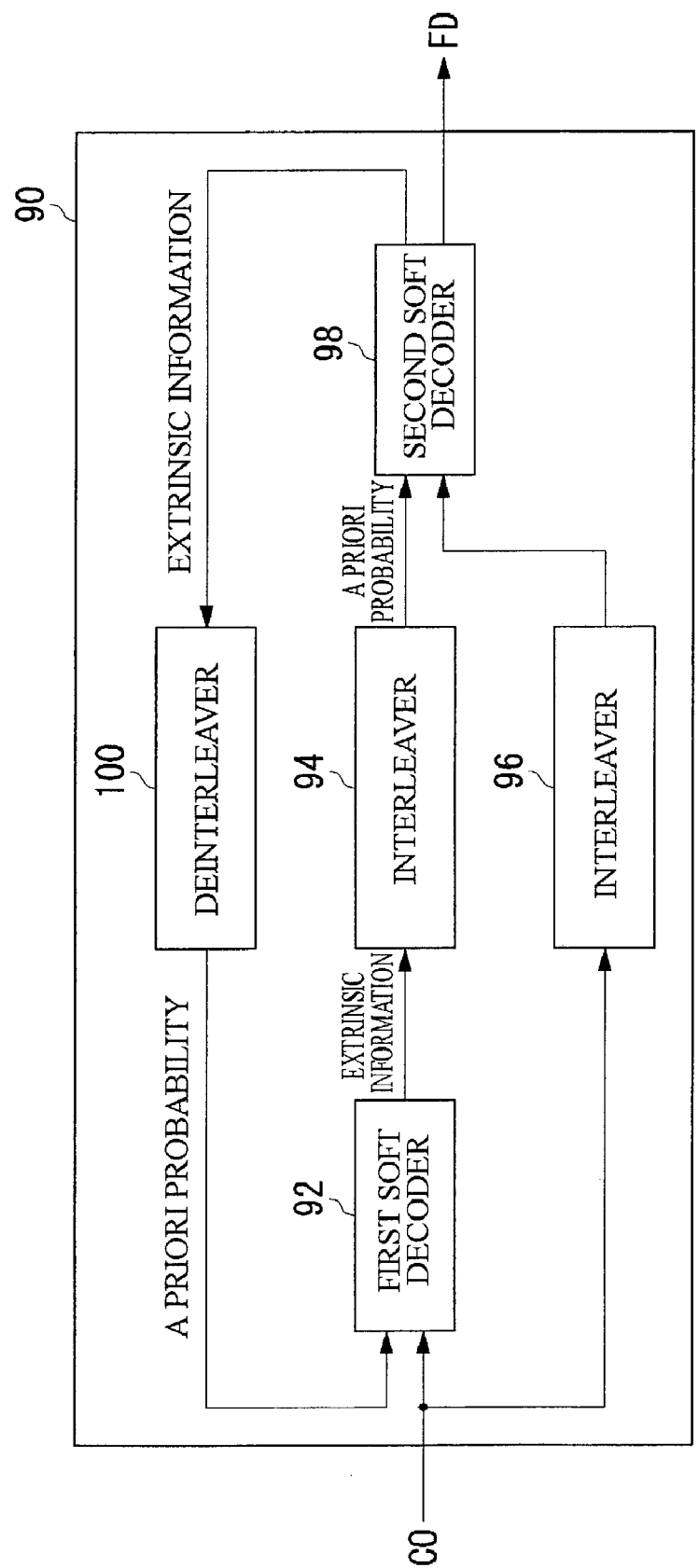
FIG. 16 is a block diagram of a turbo decoder in a decoding apparatus according to Embodiment 4.

Referring to FIG. 16, the structure and behavior of the turbo decoder 90 is explained. The first soft decoder 92 corresponding to the first encoder 72 of FIG. 15 decodes a received channel output CO and outputs extrinsic information that contains the decoding result of each information bit and its reliability information. The soft value $z_i$ that is obtained as a decision value from the received host data is herein utilized as the channel output CO. The second soft decoder 98 corresponding to the second encoder 76 of FIG. 15 uses the extrinsic information obtained from the first soft decoder 92 via an interleaver 94 as the a priori probability and decodes the channel output CO that is sorted by an interleaver 96. The second soft decoder 98 provides extrinsic information for the decoding result to the first soft decoder 92 via a deinterleaver 100. The first soft decoder 92 uses the extrinsic information from the second soft decoder 98 as the a priori probability and decodes the channel output CO. By iterating this process, the turbo decoder 90 outputs a final decision FD. The arrangement by the interleavers 94 and 96 is the same as that by interleaver 74 of FIG. 15. The deinterleaver 100 restores the data ordered randomly by the interleavers 94 and 96.

In the turbo decoder 90, the first soft decoder 92 and the second soft decoder 98 can utilize a priori information provided from the other and gradually improve the decoding result by maximum a posteriori probability (MAP) decoding.

Therefore BER in detecting watermark bits can be further reduced.

Although the present invention has been described by way of exemplary embodiments, it should be understood that many changes and substitutions may be made by those skilled in the art without departing from the scope of the present invention which is defined by the appended claims. Some such alterations are stated as follows.

The method for evaluating the robustness anticipating a specific process described in Embodiment 2 can be also applied to evaluating the robustness in Embodiment 3.

The GS method based on the convolutional operation is used for generating a plurality of candidate watermarks and candidate watermark locations, in which a variety of candidates can be generated, however, the other scrambling methods are also applicable and the candidates may be randomly generated by some methods. In the embodiments, the original watermark is restored by unscrambling the watermark bits extracted from the host data, however, a table that associates the original watermark with the candidate watermarks may be provided and the original watermark may be obtained by referring to the table.

The identification data used as initial data in the scrambling process are inserted in the head of watermark data and provided to the decoding apparatus, however, the identification data may not be embedded as the watermark and may be retained and managed as a secret key in the encoding apparatus. In this case, the decoding apparatus obtains the secret key and then descrambles the watermark. In Embodiment 3, since the decoding apparatus can identify the watermark location by using the identification data obtained as the secret key, the watermark location does not need to be detected and it becomes unnecessary to provide anticipated watermark bits beforehand.

In Embodiment 4, a turbo code is explained, however, any other soft-decision based error correction codes can be applied.

As a variation of Embodiment 1, the sequential type of candidate generation and evaluation is explained. As a matter of course, the same structure and behavior can be applied to Embodiments 2 and 3.

In Embodiment 3, the candidate watermark locations are generated by the scrambling method, however, the candidate locations may be randomly generated by looking up a table as described below. For this purpose, the encoding apparatus and the decoding apparatus have a table that associates identification data on the candidate watermark locations with the actual watermark location. In other words, the table stores a correspondence relation between identification numbers and coordinates of the watermark locations, for instance, a location (1, 19) for an identification number 0, a location (983, 251) for an identification number 1, . . . , and a location (542,37) for an identification number 15, for the first bit of the watermark. For each of the second to the n-th bits, a different correspondence relation which defines different watermark locations is stored. In this way, the watermark locations are randomly generated by some method.

The encoding apparatus, by referring to the table, generates the candidate watermark locations corresponding to its identification data and embeds the watermark in one of the candidate locations. The decoding apparatus refers to the table using the identification data on the candidate location and thereby identifies the watermark location and then extracts the watermark from the location. By this method, the randomness of the watermark location is sufficiently guaranteed and the robustness of the watermark can be realized. In addition, since the decoding apparatus cannot identify the watermark location unless the apparatus has the table as well as the identification data on the candidate locations, the security can be improved.

What is claimed is:

1. A digital watermark embedding method comprising the steps of:
   scrambling a digital watermark to be embedded in host data and thereby generating a plurality of candidate watermarks;
   embedding the respective candidate watermarks in the host data by means of embedding a watermark bit value in each element of a sample set of the host data, so as to generate a plurality of candidate watermarked host data, the sample set having a plurality of elements which are sampled from the host data;
   extracting a possible watermark from each of the plurality of the candidate watermarked host data in which each candidate watermark has been embedded, by means of extracting a possible watermark bit from each element of a sample set for each of said plurality of the candidate watermarked host data, the sample set having a plurality of elements which are sampled from each of the plurality of the candidate watermarked host data;
   evaluating robustness of the respective candidate watermarks by calculating a detection error rate of the extracted possible watermark against the each candidate watermark which has been actually embedded in the host data; and
   obtaining watermarked host data in which one of the candidate watermarks is embedded with a high level of robustness.

2. The method of claim 1 wherein
said step of embedding the respective candidate watermarks in the host data so as to generate the plurality of the candidate watermarked host data comprises:
   selecting a pair of a first sample set and a second sample set for the host data, the sample sets each having a plurality of elements which are sampled from the host data, the number of the elements being the number of watermark bits; and
   embedding each of the plurality of the candidate watermarks in the pair of the sample sets of the host data, by means of adding to each element of the first sample set of the host data a corresponding watermark bit value while subtracting from each element of the second sample set of the host data a corresponding watermark bit value, so as to generate the plurality of the candidate watermarked host data in which each candidate watermark has been embedded, and
said step of extracting the possible watermark from each of the plurality of the candidate watermarked host data in which each candidate watermark has been embedded comprises:
   selecting a pair of a first sample set and a second sample set for each of the plurality of the candidate watermarked host data, the sample sets each having a plurality of elements which are sampled from each of the plurality of the candidate watermarked host data, the number of the elements being the number of the watermark bits; and
   deciding the watermark bit value according to whether a decision value obtained by subtracting from a value of each element of the first sample of each of the plurality of the candidate watermarked host data a value of each corresponding element of the second sample thereof is positive or negative so as to extract a possible watermark from each of the plurality of the candidate watermarked host data.

3. A digital watermark embedding method comprising the steps of:
   generating a plurality of candidate locations of host data in which a digital watermark is embedded, each candidate location being a sample set having a plurality of elements which are sampled from the host data;
   embedding the watermark in each of the plurality of the candidate locations by means of embedding a watermark bit value in each element of the sample set of the host data, so as to generate a plurality of candidate watermarked host data in which the watermark has been embedded in each candidate location;
   extracting a possible watermark from each of the plurality of candidate watermarked host data in which the watermark has been embedded in each candidate location, by means of extracting a possible watermark bit from each element of a sample set for each of the plurality of the candidate watermarked host data, the sample set having a plurality of elements which are sampled from each of the plurality of the candidate watermarked host data;
   evaluating robustness of the watermark by calculating a detection error rate of the extracted possible watermark against the watermark which has been actually embedded in the host data; and obtaining watermarked host data in which the watermark is embedded with a high level of robustness in one of the candidate locations.

4. The method of claim 3, wherein said step of generating the plurality of the candidate locations of host data in which a digital watermark is embedded comprises providing each candidate location in a form of a pair of a first sample set and a second sample set for the host data, the sample sets each having a plurality of elements which are sampled from the host data, the number of the elements being the number of watermark bits, said step of embedding the watermark in each of the plurality of the candidate locations so as to generate the plurality of the candidate watermarked host data comprises embedding the watermark in each pair of the sample sets of the host data, by means of adding to each element of the first sample set of the host data a corresponding watermark bit value while subtracting from each element of the second sample set of the host data a corresponding watermark bit value, so as to generate the plurality of the candidate watermarked host data in which the watermark has been embedded in each candidate location, and said step of extracting a possible watermark from each of the plurality of candidate watermarked host data in which the watermark has been embedded in each candidate location comprises:

selecting a pair of a first sample set and a second sample set for each of the plurality of the candidate watermarked host data, the sample sets each having a plurality of elements which are sampled from each of the plurality of the candidate watermarked host data, the number of the elements being the number of the watermark bits; and deciding the watermark bit value according to whether a decision value obtained by subtracting from a value of each element of the first sample of each of the plurality of the candidate watermarked host data a value of each corresponding element of the second sample thereof is positive or negative so as to extract a possible watermark from each of the plurality of the candidate watermarked host data.

5. An encoding apparatus including a processor configured for controlling of processing a digital watermark, the apparatus comprising:

a scrambling unit which scrambles a digital watermark to be embedded in host data and generates a plurality of candidate watermarks;

an embedding unit which embeds the respective candidate watermarks in the host data by means of embedding a watermark bit value in each element of a sample set of the host data and generates a plurality of candidate watermarked host data, the sample set having a plurality of elements which are sampled from the host data;

an extracting unit which extracts a possible watermark from each of the plurality of the candidate watermarked host data in which each candidate watermark has been embedded, by means of extracting a possible watermark bit from each element of a sample set for each of the plurality of the candidate watermarked host data, the sample set having a plurality of elements which are sampled from each of the plurality of the candidate watermarked host data;

an evaluating unit which evaluates robustness of the respective candidate watermarks hidden in the respective candidate watermarked host data by calculating a detection error rate of the extracted possible watermark against the each candidate watermark which has been actually embedded in the host data; and a selecting unit which selects and outputs one of the plurality of the candidate watermarked host data according to the evaluated robustness.

6. The apparatus of claim 5, wherein:

the extracting unit extracts a possible watermark from the watermarked host data according to a hard decision; and the evaluating unit evaluates the robustness by calculating a detection error rate of the extracted possible watermark according to the hard decision against the each candidate watermark which has been actually embedded in the host data.

7. The apparatus of claim 5, wherein the evaluating unit evaluates the robustness after utility operations are conducted on the watermarked host data.

8. The apparatus of claim 5, wherein the evaluating unit evaluates the robustness taking account of quantization errors in compressing the watermarked host data.

9. The apparatus of claim 5, wherein the scrambling unit inserts identification data necessary for descrambling in the candidate watermark generated by the scrambling.

10. The apparatus of claim 9, wherein the scrambling unit scrambles the watermark by means of an operation using the identification data.

11. The apparatus of claim 9, wherein the identification data comprise information for identifying the candidate watermark, and the scrambling unit scrambles the watermark by performing a convolutional operation on the watermark using the identification data.

12. The apparatus of claim 5, wherein the scrambling unit retains identification data necessary for descrambling the scrambled watermark as a secret key.

13. The apparatus of claim 12, wherein the scrambling unit scrambles the watermark by means of an operation using the identification data.

14. The apparatus of claim 12, wherein the identification data comprise information for identifying the candidate watermark, and the scrambling unit scrambles the watermark by performing a convolutional operation on the watermark using the identification data.

15. The apparatus of claim 5, wherein:

said embedding unit is operable to:

select a pair of a first sample set and a second sample set for the host data, the sample sets each having a plurality of elements which are sampled from the host data, the number of the elements being the number of watermark bits; and embed each of the plurality of the candidate watermarks in the pair of the sample sets of the host data, by means of adding to each element of the first sample set of the host data a corresponding watermark bit value while subtracting from each element of the second sample set of the host data a corresponding watermark bit value, so as to generate the plurality of the candidate watermarked host data in which each candidate watermark has been embedded, and said extracting unit is operable to:

select a pair of a first sample set and a second sample set for each of the plurality of the candidate watermarked host data, the sample sets each having a plurality of elements which are sampled from each of the plurality of the candidate watermarked host data, the number of the elements being the number of the watermark bits; and decide the watermark bit value according to whether a decision value obtained by subtracting from a value of each element of the first sample of each of the plurality of the candidate watermarked host data a value of each corresponding element of the second sample thereof is positive or negative so as to extract a possible watermark from each of the plurality of the candidate watermarked host data.

16. An encoding apparatus including a processor configured for controlling of embedding a digital watermark into data, the apparatus comprising:
- a location information generating unit which generates a plurality of candidate locations of host data in which a digital watermark is to be embedded, each candidate location being a sample set having a plurality of elements which are sampled from the host data;
- an embedding unit which embeds the watermark in the respective candidate locations of the host data by means of embedding a watermark bit value in each element of the sample set of the host data and generates a plurality of candidate watermarked host data in which the watermark has been embedded in each candidate location;
- an extracting unit which extracts a possible watermark from each of the plurality of the candidate watermarked host data in which the watermark has been embedded in each candidate location, by means of extracting a possible watermark bit from each element of a sample set for each of the plurality of the candidate watermarked host data, the sample set having a plurality of elements which are sampled from each of said plurality of the candidate watermarked host data;
- an evaluating unit which evaluates robustness of the digital watermark embedded in the respective candidate watermarked host data by calculating a detection error rate of the extracted possible watermark against the watermark which has been actually embedded in the host data; and
- a selecting unit which selects and outputs one of the plurality of the candidate watermarked host data according to the evaluated robustness.

17. The apparatus of claim 16, wherein
the extracting unit extracts a possible watermark from the watermarked host data according to a hard decision, and
the evaluating unit evaluates the robustness by calculating a detection error rate of the extracted possible watermark according to the hard decision against the each candidate watermark which has been actually embedded in the host data.

18. The apparatus of claim 16, wherein the evaluating unit evaluates the robustness after utility operations are conducted on the watermarked host data.

19. The apparatus of claim 16, wherein the evaluating unit evaluates the robustness taking account of quantization errors in compressing the watermarked host data.

20. The apparatus of claim 16, wherein the location information generating unit generates the plurality of the candidate locations by referring to a table which associates identification data on each of the candidate locations with a random location of the host data.

21. The apparatus of claim 20, wherein the location information generating unit retains the identification data as a secret key after generating the candidate locations.

22. The apparatus of claim 16, wherein
said location information generating unit provides each candidate location in a form of a pair of a first sample set and a second sample set for the host data, the sample sets each having a plurality of elements which are sampled from the host data, the number of the elements being the number of watermark bits,
said embedding unit embeds the watermark in each pair of the sample sets of the host data, by means of adding to each element of the first sample set of the host data a corresponding watermark bit value while subtracting from each element of the second sample set of the host data a corresponding watermark bit value, so as to generate the plurality of the candidate watermarked host data in which the watermark has been embedded in each candidate location, and
said extracting unit is operable to:
- select a pair of a first sample set and a second sample set for each of the plurality of the candidate watermarked host data, the sample sets each having a plurality of elements which are sampled from each of the plurality of the candidate watermarked host data, the number of the elements being the number of the watermark bits; and
- decide the watermark bit value according to whether a decision value obtained by subtraction from a value of each element of the first sample of each of the plurality of the candidate watermarked host data a value of each corresponding element of the second sample thereof is positive or negative so as to extract a possible watermark from each of the plurality of the candidate watermarked host data.

23. A decoding apparatus including a processor configured for controlling of processing a watermark, the apparatus comprising:
an extracting unit which extracts a scrambled watermark from watermarked host data, one of a plurality of candidate watermarks being supposed to have been embedded in a pair of a first sample set and a second sample set for the host data, the sample sets each having a plurality of elements which are sampled from the host data, the number of the elements being the number of watermark bits, by means of adding to each element of the first sample set of the host data a corresponding watermark bit value while subtracting from each element of the second sample set of the host data a corresponding watermark bit value, the respective candidate watermarks being scrambled by performing a convolutional operation on a digital watermark to be embedded in the host data using as a redundant word an identification data for identifying the respective candidate watermarks, the extracting unit being operable to:
- select a pair of the first sample set and the second sample set for the watermarked host data; and
- decide the watermark bit value according to whether a decision value obtained by subtracting from a value of each element of the first sample of the watermarked host data a value of each corresponding element of the second sample thereof is positive or negative so as to extract a possible watermark from the watermarked host data, and
a descrambling unit which descrambles the extracted watermark which has been scrambled by performing a convolutional operation on the watermark using as a redundant word the identification data for identifying any one of the candidate watermarks.

24. The apparatus of claim 23, wherein the descrambling unit extracts the identification data from a part of the scrambled watermark.

25. The apparatus of claim 23, wherein the descrambling unit obtains the identification data as a secret key.

26. A decoding apparatus including a processor configured for controlling of processing a digital watermark, the apparatus comprising:

a location information generating unit which when host data is given which contains a digital watermark supposed to have been embedded in one of a plurality of candidate locations thereof, generates the plurality of candidate locations of the host data by referring to a table which stores the plurality of candidate locations, each candidate location being provided in a form of a pair of a first sample set and a second sample set for the host data, the sample sets each having a plurality of elements which are sampled from the host data, the number of the elements being the number of watermark bits, the watermark being supposed to have been embedded in each pair of the sample sets of the host data, by means of adding to each element of the first sample set of the host data a corresponding watermark bit value while subtracting from each element of the second sample set of the host data a corresponding watermark bit value;

an extracting unit which extracts a plurality of candidate watermarks embedded in the host data according to the respective candidate locations, the extracting unit being operable to:

select a pair of the first sample set and the second sample set for the watermarked host data; and decide the watermark bit value according to whether a decision value obtained by subtracting from a value of each element of the first sample of the watermarked host data a value of each corresponding element of the second sample thereof is positive or negative so as to extract a possible watermark from the watermarked host data;

a checking unit which checks the plurality of the extracted candidate watermarks with an anticipated watermark; and a selecting unit which selects and outputs one of the candidate watermarks according to a checking result produced by the checking unit.

27. The apparatus of claim 26, wherein the location information generating unit generates the plurality of the candidate locations by referring to a table which associates identification data on each of the candidate locations with a random location of the host data.

28. A decoding apparatus including a processor configured for controlling of processing a digital watermark, the apparatus comprising:

a location information generating unit which when host data is given which contains a digital watermark supposed to have been embedded in one of the plurality of candidate locations thereof, obtains a secret key which indicates identification data for identifying any one of the plurality of candidate locations, and identifies the location by decrypting the secret key and referring to a table which associates the identification data with a random location of the host data, each candidate location being provided in a form of a pair of a first sample set and a second sample set for the host data, the sample sets each having a plurality of elements which are sampled from the host data, the number of the elements being the number of watermark bits, the watermark being supposed to have been embedded in each pair of the sample sets of the host data, by means of adding to each element of the first sample set of the host data a corresponding watermark bit value while subtracting from each element of the second sample set of the host data a corresponding watermark bit value; and an extracting unit which extracts a watermark from the host data according to the identified location, the extracting unit being operable to:

select a pair of the first sample set and the second sample set for the watermarked host data; and decide the watermark bit value according to whether a decision value obtained by subtracting from a value of each element of the first sample of the watermarked host data a value of each corresponding element of the second sample thereof is positive or negative so as to extract a possible watermark from the watermarked host data.

29. A computer readable storage medium encoded with a host data structure in which a digital watermark is hidden, comprising:

one of a plurality of candidate watermarks embedded in a pair of a first sample set and a second sample set for the host data, the sample sets each having a plurality of elements which are sampled from the host data, the number of the elements being the number of watermark bits, by means of adding to each element of the first sample set of the host data the corresponding watermark bit value while subtracting from each element of the second sample set of the host data the corresponding watermark bit value, each of the candidate watermarks being scrambled by performing a convolutional operation on a digital watermark to be embedded in the host data using as a redundant word an identification data for identifying the respective candidate watermarks; and the redundant word which has been used in the convolutional operation which are incorporated as a part of the scrambled watermark embedded in the host data, the redundant word being data necessary for descrambling the scrambled watermark.

30. A computer readable storage medium encoded with a computer program executable by a computer, the program causing the computer to perform the steps of:

generating a plurality of candidate watermarks by scrambling a digital watermark to be embedded in host data;

generating a plurality of candidate watermarked host data by embedding the respective candidate watermarks in the host data by means of embedding a watermark bit value in each element of a sample set of the host data, so as to generate a plurality of candidate watermarked host data, the sample set having a plurality of elements which are sampled from the host data;

extracting a possible watermark from each of the plurality of the candidate watermarked host data in which each candidate watermark has been embedded, by means of extracting a possible watermark bit from each element of a sample set for each of the plurality of the candidate watermarked host data, the sample set having a plurality of elements which are sampled from each of said plurality of the candidate watermarked host data;

evaluating robustness of the respective candidate watermarks hidden in the respective candidate watermarked host data by calculating a detection error rate of the extracted possible watermark against the each candidate watermark which has been actually embedded in the host data; and selecting one of the plurality of the candidate watermarked host data according to the evaluated robustness.

31. The computer readable storage medium of claim 30, wherein said step of generating the plurality of candidate watermarked host data by embedding the respective candidate watermarks in the host data comprises:

selecting a pair of a first sample set and a second sample set for the host data, the sample sets each having a plurality of elements which are sampled from the host data, the number of the elements being the number of watermark bits; and embedding each of the plurality of the candidate watermarks in the pair of the sample sets of the host data, by means of adding to each element of the first sample set of the host data a corresponding watermark bit value while subtracting from each element of the second sample set of the host data a corresponding watermark bit value, so as to generate the plurality of the candidate watermarked host data in which each candidate watermark has been embedded, and said step of extracting the possible watermark from each of the plurality of the candidate watermarked host data in which each candidate watermark has been embedded comprises:

selecting a pair of a first sample set and a second sample set for each of the plurality of the candidate watermarked host data, the sample sets each having a plurality of elements which are sampled from each of the plurality of the candidate watermarked host data, the number of the elements being the number of the watermark bits; and deciding the watermark bit value according to whether a decision value obtained by subtracting from a value of each element of the first sample of each of the plurality of the candidate watermarked host data a value of each corresponding element of the second sample thereof is positive or negative so as to extract a possible watermark from each of the plurality of the candidate watermarked host data.

32. A computer readable storage medium encoded with a computer program executable by a computer, the program causing the computer to perform the steps of:

generating a plurality of candidate locations of host data in which a digital watermark is embedded, each candidate location being a sample set having a plurality of elements which are sampled from the host data;

generating a plurality of candidate watermarked host data by embedding the watermark in the respective candidate locations of the host data by means of embedding a watermark bit value in each element of the sample set of the host data;

extracting a possible watermark from each of the plurality of candidate watermarked host data in which the watermark has been embedded in each candidate location, by means of extracting a possible watermark bit from each element of a sample set for each of the plurality of the candidate watermarked host data, the sample set having a plurality of elements which are sampled from each of the plurality of the candidate watermarked host data;

evaluating robustness of the watermark hidden in the respective watermarked host data by calculating a detection error rate of the extracted possible watermark against the watermark which has been actually embedded in the host data; and selecting one of the plurality of the candidate watermarked host data according to the evaluated robustness.

33. The computer readable storage medium of claim 32, wherein:

said step of generating the plurality of the candidate locations of host data in which a digital watermark is embedded comprises providing each candidate location in a form of a pair of a first sample set and a second sample set for the host data, the sample sets each having a plurality of elements which are sampled from the host data, the number of the elements being the number of watermark bits, said step of generating a plurality of candidate watermarked host data by embedding the watermark in the respective candidate locations of the host data comprises embedding the watermark in each pair of the sample sets of the host data, by means of adding to each element of the first sample set of the host data a corresponding watermark bit value while subtracting from each element of the second sample set of the host data a corresponding watermark bit value, so as to generate the plurality of the candidate watermarked host data in which the watermark has been embedded in each candidate location, and said step of extracting a possible watermark from each of the plurality of candidate watermarked host data in which the watermark has been embedded in each candidate location comprises:

selecting a pair of a first sample set and a second sample set for each of the plurality of the candidate watermarked host data, the sample sets each having a plurality of elements which are sampled from each of the plurality of the candidate watermarked host data, the number of the elements being the number of watermark bits; and deciding the watermark bit value according to whether a decision value obtained by subtracting from a value of each element of the first sample of each of the plurality of the candidate watermarked host data a value of each corresponding element of the second sample thereof is positive or negative so as to extract a possible watermark from each of the plurality of the candidate watermarked host data.

* * * * *